US012678009B2

(12) United States Patent
Ko et al.

(10) Patent No.:      US 12,678,009 B2
(45) Date of Patent:         Jul. 14, 2026

(54) MOBILE DEVICE FOR PERFORMING IN-HOME WIRELESS CONNECTION AND METHOD OF PERFORMING WIRELESS CONNECTION

(71) Applicant: SAMSUNG ELECTRONICS CO., LTD., Suwon-si (KR)

(72) Inventors: Jongjin Ko, Suwon-si (KR); Heejun Kang, Suwon-si (KR); Jongwon Park, Suwon-si (KR); Sunghoon Byeon, Suwon-si (KR); Jaegeun Son, Suwon-si (KR); Donghoon Shin, Suwon-si (KR); Jaechan Lee, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 90 days.

(21) Appl. No.: 18/914,110

(22) Filed: Oct. 12, 2024

(65) Prior Publication Data

US 2025/0057380 A1      Feb. 20, 2025

Related U.S. Application Data

(63) Continuation of application No. PCT/KR2024/095949, filed on Aug. 1, 2024.

(30) Foreign Application Priority Data

Aug. 14, 2023    (KR) ........................ 10-2023-0106459

(51) Int. Cl.
| | |
|---|---|
| *A47L 11/40* | (2006.01) |
| *A47L 11/24* | (2006.01) |
| *H04W 4/33* | (2018.01) |
| *H04W 4/80* | (2018.01) |
| *A47L 9/28* | (2006.01) |

(Continued)

(52) U.S. Cl.
CPC .......... *A47L 11/4011* (2013.01); *A47L 11/24* (2013.01); *H04W 4/33* (2018.02); *H04W 4/80* (2018.02);

(Continued)

(58) Field of Classification Search
CPC .... A47L 11/4011; A47L 11/24; A47L 9/2894; A47L 2201/04; H04W 4/33; H04W 4/80; H04W 76/10; G05D 1/43; H04L 12/2803
See application file for complete search history.

(56) References Cited

U.S. PATENT DOCUMENTS 9,769,686 B2    9/2017  Kang et al.
11,252,636 B2   2/2022  Yang et al.
(Continued)

FOREIGN PATENT DOCUMENTS

KR        20060076940 A      7/2006
KR         100664062 B1 *    1/2007
(Continued)

OTHER PUBLICATIONS

International Search Report corresponding to Application No. PCT/KR2024/095949; Issue Date Oct. 29, 2024.

*Primary Examiner* — Abby Lin
*Assistant Examiner* — Karston G. Evans
(74) *Attorney, Agent, or Firm* — CANTOR COLBURN LLP

(57)      ABSTRACT

A robot cleaner having a function of performing a wireless connection with a home appliance in an insufficient wireless coverage area inside a home includes a brush for performing cleaning to suck in dust while the robot cleaner is moving, a driving unit configured to move the robot cleaner to perform cleaning through the brush, a processor configured to, based on determining that the wireless connection with a first home appliance inside the home is unavailable, drive and control the driving unit to move within a predetermined distance from the first home appliance to establish the wireless connection with the first home appliance, and a communication interface configured to receive a connection request signal from the first home appliance, and upon (Continued)

receiving the connection request signal, establish the wireless connection based on the connection request signal.

20 Claims, 25 Drawing Sheets

(51) Int. Cl.
  *G05D 1/43*      (2024.01)
  *H04L 12/28*     (2006.01)
  *H04W 76/10*    (2018.01)

(52) U.S. Cl.
  CPC ......... *A47L 9/2894* (2013.01); *A47L 2201/04* (2013.01); *G05D 1/43* (2024.01); *H04L 12/2803* (2013.01); *H04W 76/10* (2018.02)

(56)        References Cited

U.S. PATENT DOCUMENTS

| | | | |
|---|---|---|---|
| 11,317,778 B2 | 5/2022 | Kim | |
| 2007/0021867 A1* | 1/2007 | Woo | H04L 12/282 |
| | | | 700/245 |

| | | | | |
|---|---|---|---|---|
| 2015/0061879 A1* | 3/2015 | Sone | | G05B 15/02 |
| | | | | 340/635 |
| 2023/0004172 A1 | 1/2023 | Shao et al. | | |
| 2024/0098592 A1* | 3/2024 | Janneteau | | H04W 36/304 |

FOREIGN PATENT DOCUMENTS

| | | | | | |
|---|---|---|---|---|---|
| KR | 20070013101 A | | 1/2007 | | |
| KR | 100694218 B1 | | 3/2007 | | |
| KR | 101718329 B1 | | 4/2017 | | |
| KR | 20180050006 A | | 5/2018 | | |
| KR | 20180087779 A | | 8/2018 | | |
| KR | 20190076175 A | | 7/2019 | | |
| KR | 102022666 B1 | | 9/2019 | | |
| KR | 102032223 B1 | | 10/2019 | | |
| KR | 20190110861 A | | 10/2019 | | |
| KR | 102098156 B1 | | 4/2020 | | |
| KR | 20210137807 A | * | 11/2021 | ............ | B25J 9/1682 |
| KR | 20220159629 A | | 12/2022 | | |

* cited by examiner

MOBILE DEVICE FOR PERFORMING IN-HOME WIRELESS CONNECTION AND METHOD OF PERFORMING WIRELESS CONNECTION

CROSS-REFERENCE TO RELATED APPLICATIONS

This application is a continuation application under, 35 U.S.C. § 111(a), of International Patent Application No. PCT/KR2024/095949, filed on Aug. 1, 2024, which claims priority to Korean Patent Application No. 10-2023-0106459, filed on Aug. 14, 2023, the content of which in their entirety is herein incorporated by reference.

BACKGROUND

Technical Field

An embodiment of the disclosure relates to a method of performing wireless connection with a device located in an insufficient wireless coverage area inside a home, and a mobile device for performing the method.

Description of Related Art

As many electronic devices inside a home (hereinafter, referred to as 'in-home electronic devices') are connected to a network, a user is able to perform centralized control of the devices through a user terminal. In order to perform centralized control of in-home electronic devices, the in-home electronic devices need to be located in an area where wireless communication, such as Wi-Fi, is available. However, wireless connections may be affected as the distances between the electronic devices increase due to more complex structures and increased areas of homes or by obstacles such as various household tools or bookshelves. As such, it often happens that electronic devices are located in areas where wireless connection does not work well. One way to eliminate wireless coverage gaps is installing additional routers or wireless routers, but this increases costs. Thus, there is a need to enable connection with electronic devices located in insufficient wireless coverage areas inside a home without installing additional wire or wireless routers.

SUMMARY

A robot cleaner capable of moving for cleaning according to an embodiment of the disclosure includes a battery to supply power to the robot cleaner. According to an embodiment of the disclosure, the robot cleaner includes a suction motor configured to suck in dust. According to an embodiment of the disclosure, the robot cleaner includes a sensor unit configured to establish a movement path while the robot cleaner is moving. According to an embodiment of the disclosure, the robot cleaner includes a brush to perform cleaning for sucking in dust while the robot cleaner is moving. According to an embodiment of the disclosure, the robot cleaner includes a driving unit driven by the battery and including driving wheels for moving along the movement path established by the sensor unit to perform cleaning through the brush and the suction motor. According to an embodiment of the disclosure, the robot cleaner includes a processor configured to, based on determining, based on a strength of a wireless connection signal between a first home appliance and a wireless router inside a home, that a wireless connection between the first home appliance and the wireless router is unavailable, drive and control the driving unit to move within a predetermined distance from the first home appliance, for establishing the wireless connection with the first home appliance. According to an embodiment of the disclosure, the robot cleaner includes a communication interface configured to, based on the first home appliance being located within a predetermined distance, receive a connection request signal from the first home appliance, and upon receiving the connection request signal, establish the wireless connection with the first home appliance based on the received connection request signal. In the robot cleaner according to an embodiment of the disclosure, the communication interface includes at least one of a Bluetooth Low Energy (BLE) communication unit or a Wi-Fi communication unit.

A cordless cleaner device having an in-home wireless connection function according to an embodiment of the disclosure includes a battery to supply power to the cordless cleaner device. According to an embodiment of the disclosure, the cordless cleaner device includes a suction motor configured to suck in dust. According to an embodiment of the disclosure, the cordless cleaner device includes a processor configured to determine, based on the strength of a wireless connection signal between a first home appliance and a wireless router inside a home, that a wireless connection between the first home appliance and the wireless router is unavailable. According to an embodiment of the disclosure, the cordless cleaner device includes a user interface configured to, based on determining that the wireless connection between the first home appliance and the wireless router is unavailable, output guide information for the wireless connection with the first home appliance. According to an embodiment of the disclosure, the cordless cleaner device includes a communication interface configured to, based on the cordless cleaner device moving within a predetermined distance from the first home appliance based on the guide information, receive a connection request signal from the first home appliance, and upon receiving the connection request signal, establish the wireless connection based on the received connection request signal. In the cordless cleaner device according to an embodiment of the disclosure, the communication interface includes at least one of a BLE communication unit or a Wi-Fi communication unit.

A method, performed by a robot cleaner, of performing in-home wireless connection according to an embodiment of the disclosure includes determining, based on a wireless connection signal strength, that a wireless connection with a first home appliance inside a home is unavailable. The method of performing in-home wireless connection according to an embodiment of the disclosure includes, based on determining that a wireless connection with the first home appliance is unavailable, driving and controlling a driving unit of the robot cleaner to move within a predetermined distance from the first home appliance to establish the wireless connection with the first home appliance. The method of performing in-home wireless connection according to an embodiment of the disclosure includes, based on the robot cleaner being located within the predetermined distance from the first home appliance, receiving a connection request signal from the first home appliance. The method of performing in-home wireless connection according to an embodiment of the disclosure includes establishing the wireless connection based on the received connection request signal.

BRIEF DESCRIPTION OF THE DRAWINGS

FIG. 3A is a plan view illustrating an electronic device located in an insufficient wireless coverage area inside a home, according to an embodiment of the disclosure.

FIG. 4 is a diagram illustrating a mobile device moving near an electronic device and performing wireless connection, according to an embodiment of the disclosure.

FIG. 9 is a diagram illustrating a user terminal performing wireless connection with an electronic device located in an insufficient wireless coverage area inside a home, according to an embodiment of the disclosure.

DETAILED DESCRIPTION

Figure 1A:
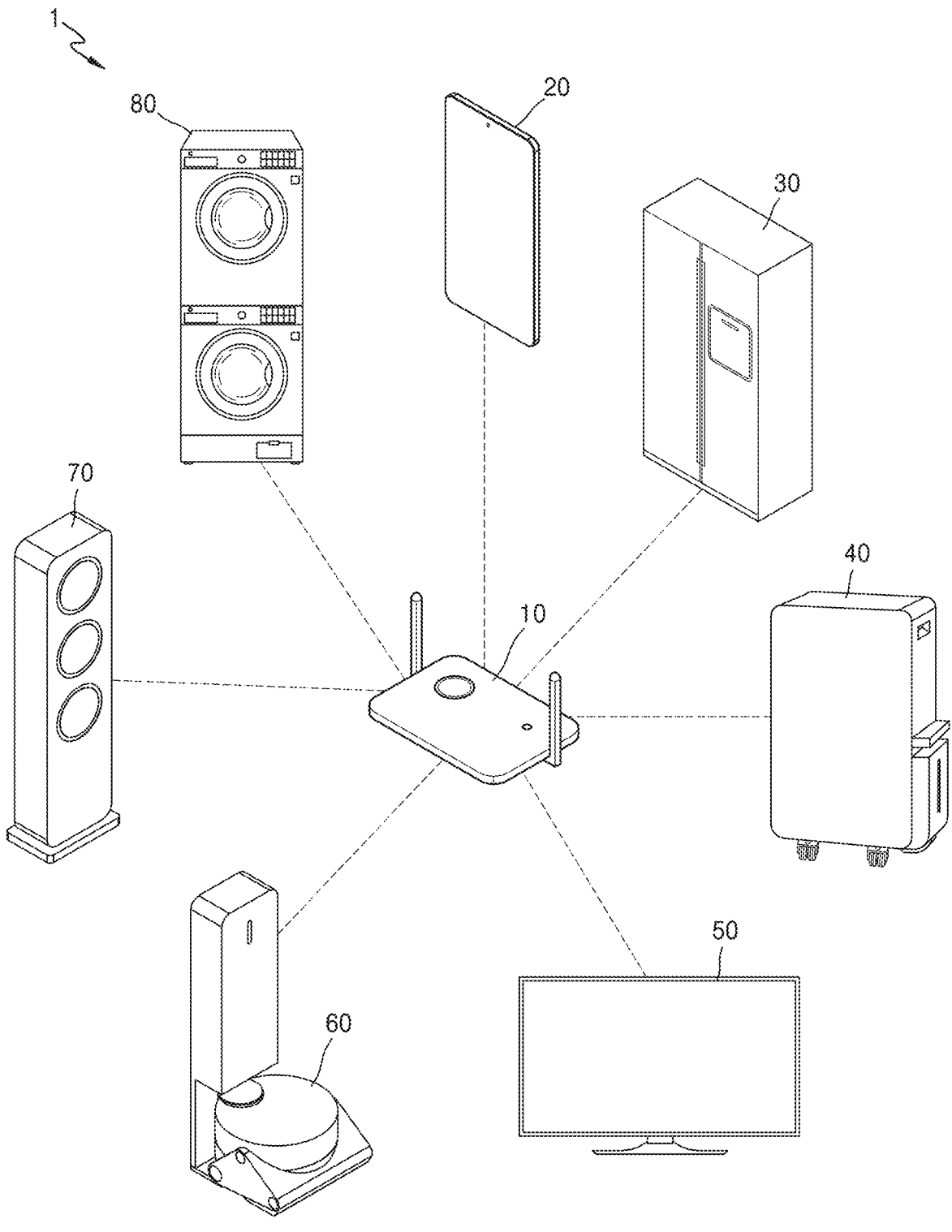
FIG. 1A is a diagram illustrating a network of in-home electronic devices, according to an embodiment of the disclosure.

Terms used herein will be briefly described, and then an embodiment of the disclosure will be described in detail.

Although the terms used herein are selected from among common terms that are currently widely used in consideration of their functions in an embodiment of the disclosure, the terms may be different according to an intention of one of ordinary skill in the art, a precedent, or the advent of new technology. Also, in particular cases, the terms are discretionally selected by the applicant of the disclosure, in which case, the meaning of those terms will be described in detail in the corresponding description of an embodiment of the disclosure. Therefore, the terms used herein are not merely designations of the terms, but the terms are defined based on the meaning of the terms and content throughout the disclosure.

As used herein, the expression "at least one of a, b, or c" may indicate only a, only b, only c, both a and b, both a and c, both b and c, all of a, b, and c, or variations thereof.

Throughout the disclosure, when a part "includes" an element, it is to be understood that the part may additionally include other elements rather than excluding other elements as long as there is no particular opposing recitation. In addition, as used herein, the terms such as " . . . er (or)", " . . . unit", " . . . module", etc., denote a unit that performs at least one function or operation, which may be implemented as hardware or software or a combination thereof.

Hereinafter, an embodiment of the disclosure will be described in detail with reference to the accompanying drawings to allow those of skill in the art to easily carry out the embodiment. An embodiment of the disclosure may, however, be embodied in many different forms and should not be construed as being limited to the embodiment set forth herein. Also, parts in the drawings unrelated to the detailed description are omitted to ensure clarity of an embodiment of the disclosure, and like reference numerals in the drawings denote like elements.

According to an embodiment of the disclosure, there is a need to enable communication connection with electronic devices located in insufficient communication coverage areas where in-home wireless communication is affected, without installing additional routers or wireless routers.

FIG. 1A is a diagram illustrating a network of in-home electronic devices, according to an embodiment of the disclosure.

Referring to FIG. 1A, various electronic devices inside a home may form an in-home communication network 1 around a wireless router 10. The electronic devices may include a refrigerator 30, a television (TV) 50, an air conditioner 70, and a washing machine/dryer 80, which are fixed in position, and a user terminal 20, a dehumidifier 40, and a robot cleaner 60, which are not fixed in position and can frequently move. The electronic devices may exchange information with a desired device through the in-home communication network 1, and may also be connected to a device outside the home through an external network. An in-home wireless network may use communication methods such as Bluetooth (Bluetooth Low Energy (BLE)), ultra-wideband (UWB), Zigbee, Home Radio-Frequency (HomeRF), Infrared Data Association (IrDA), wireless local area network (LAN), or Z-Wave.

However, the wireless router 10, which serves as a gateway to the in-home communication network 1, is often located in a living room where the TV 50 is located. Therefore, it may be difficult to establish wireless communication connection with electronic devices located far from the living room, such as a bedroom or a dressing room, or in an environment with many obstacles that hinder wireless communication. In this case, in order to solve an issue of unavailable wireless communication connection between electronic devices located away from the wireless router 10, for example, an additional wireless router may be installed in a bedroom in communication with to a dressing room, but this leads to an increase in costs. Therefore, there is a need for a method that allows an electronic device located at a remote position inside a home to be incorporated into an in-home communication network without additional devices or costs.

Figure 1B:
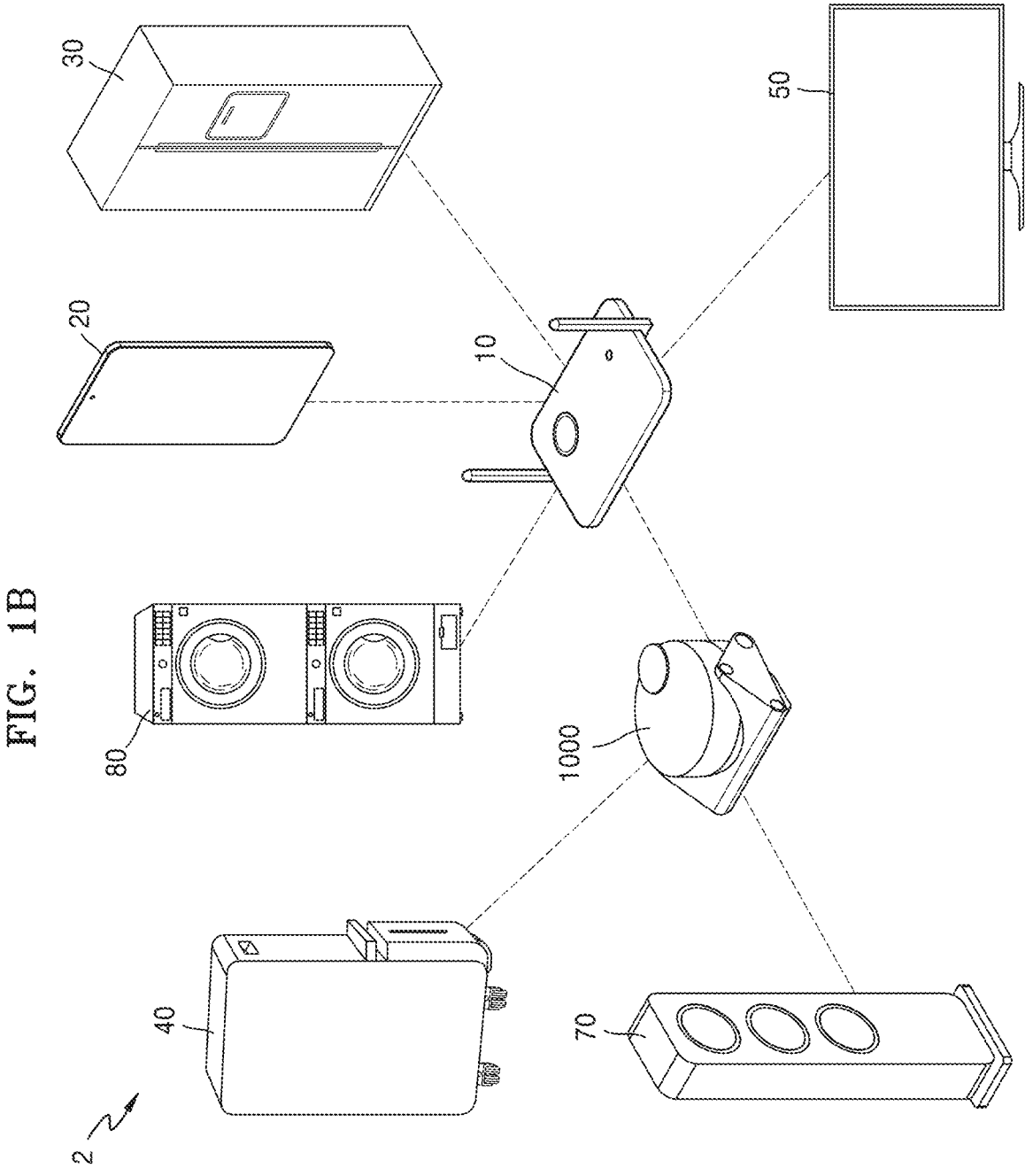
FIG. 1B illustrates a structure of an in-home wireless network according to an embodiment of the disclosure.

FIG. 1B illustrates a structure of an in-home wireless network according to an embodiment of the disclosure.

FIG. 1B illustrates an in-home wireless network 2 using a mobile device 1000. In an embodiment of the disclosure, it may be difficult for the wireless router 10 to easily establish wireless connection with the dehumidifier 40 located in a dressing room inside a home, and the air conditioner 70 located in a bedroom that is located furthest inside the home from the wireless router 10. Thus, it may be described that the dehumidifier 40 and the air conditioner 70 are located in insufficient wireless coverage areas inside the home, or wireless communication obstruction areas inside the home. In an embodiment of the disclosure, the mobile device 1000, which is movable and able to perform wireless communication with the wireless router 10, may move to near an insufficient wireless coverage area inside the home to perform wireless communication with the dehumidifier 40 and/or the air conditioner 70. A process of performing wireless connection with an electronic device located in an insufficient wireless coverage area inside a home will be described below. The dehumidifier 40 or the air conditioner 70 that has established wireless connection with the mobile device 1000, which has moved to or near the insufficient wireless coverage area inside the home, may also be able to perform communication with the wireless router 10 and other electronic devices constituting an in-home network with the wireless router 10, for example, the user terminal 20. Thus, the dehumidifier 40 or the air conditioner 70 located in the insufficient wireless coverage area inside the home may transmit and receive data to and from other electronic devices constituting the in-home network, through the mobile device 1000.

In an embodiment of the disclosure according to the disclosure, the mobile device 1000, which performs wireless communication connection with the dehumidifier 40 and/or the air conditioner 70 in the insufficient wireless coverage area inside the home, may be any electronic device that is movable and capable of performing wireless communication connection. For example, the mobile device 1000 may be a robot cleaner that is able to move on its own, a serving robot in a restaurant, a stick-type cleaner body (e.g., a cordless cleaner device) that may be carried and moved by a user, or the user terminal 20.

When the mobile device 1000 moves to or near an insufficient wireless coverage area inside the home and then wirelessly connects to an electronic device in the insufficient wireless coverage area in the home, BLE connection may be used. In an embodiment of the disclosure, BLE connection throughout the disclosure may be simply BLE connection or BLE mesh network wireless communication connection. In an embodiment of the disclosure, throughout the disclosure, the mobile device 1000 may move to or near an insufficient wireless coverage area inside the home, and attempt to establish BLE connection with an electronic device in the insufficient wireless coverage area inside the home when BLE mesh network wireless communication connection is unavailable. In an embodiment of the disclosure, throughout the disclosure, the mobile device 1000 may move to or near an insufficient wireless coverage area inside the home, and attempt to establish BLE mesh network wireless communication connection with an electronic device in the insufficient wireless coverage area inside the home when BLE connection is unavailable.

A BLE mesh network is a topology for wireless networking. Within the BLE mesh network, any node may transmit data to any node within the entire in-home network. Thus, in FIG. 1B, when the dehumidifier 40 and/or the air conditioner 70 constitutes a BLE mesh network with the mobile device 1000, the dehumidifier 40 and/or the air conditioner 70 may transmit and receive data to and from the entire in-home network including the wireless router 10, through the mobile device 1000. The BLE mesh network has a wide communication area and unlimited node connections, and may solve short-distance Bluetooth connection issues. BLE mesh networks are currently becoming the main communication method for Internet of Things (IoT).

In an embodiment of the disclosure, when BLE connection is not supported between the mobile device 1000 and an electronic device in an insufficient wireless coverage area inside the home, the mobile device 1000 may perform Wi-Fi Direct (WFD) connection with the electronic device located in the insufficient wireless coverage area inside the home. Thus, the mobile device 1000 may perform WFD connection with the electronic device located in the insufficient wireless coverage area inside the home, and the electronic device located in the insufficient wireless coverage area inside the home may transmit and receive data to and from other electronic devices constituting the in-home network, through the mobile device 1000. WFD connection is a communication technology that allows electronic devices, which support Wi-Fi communication, to directly communicate with each other without accessing a Wi-Fi wireless router (e.g., the wireless router 10 of FIG. 1B). In order for electronic devices connected to each other by using a WFD method to use the Internet, at least one of the two electronic devices need to be connected to the Internet. According to an embodiment of the disclosure, when WFD connection is established between the mobile device 1000 and the dehumidifier 40 in FIG. 1B, the mobile device 1000 may be connected to the Internet.

Figure 2A:
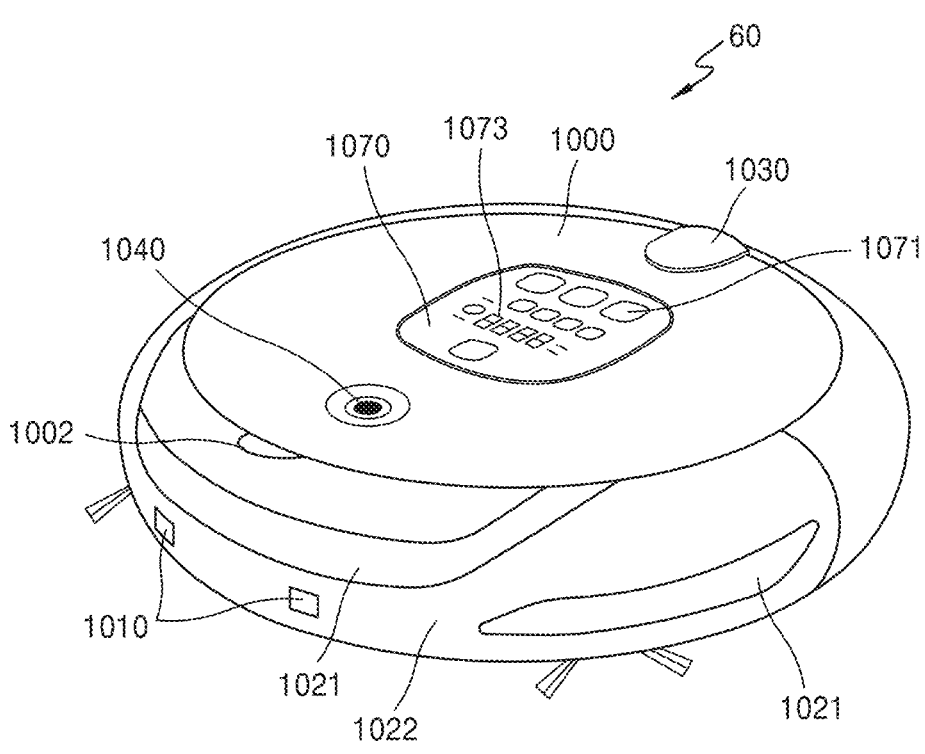
FIG. 2A is a diagram for describing a structure of one side of a robot cleaner as a mobile device, according to an embodiment of the disclosure.

FIG. 2A is a diagram for describing a structure of one side of a robot cleaner as a mobile device, according to an embodiment of the disclosure.

FIG. 2A is a perspective view of the robot cleaner 60 serving as the mobile device 1000 when viewed from above. Although the robot cleaner 60 is divided into a robot cleaner main body that performs cleaning while moving and a station fixed at a particular location, hereinafter, for convenience of description, the robot cleaner 60 will refer to the robot cleaner main body that moves for cleaning. The robot cleaner 60 may include, but is not limited to, a charging terminal 1010, a remote control receiver 1002, an obstacle sensor 1021, a bumper sensor 1022, a dust outlet 1030, a camera 1040, and an input interface 1071 and an output interface 1073 both constituting a user interface 1070. Although not illustrated in FIG. 2A, the robot cleaner 60 may include a battery that receives power supplied.

The output interface 1073 may display a current state (e.g., cleaning, charging, charging terminal overheating, battery charging not possible due to low temperature), a state of charge of a battery, a current cleaning mode (e.g., quick mode, precise mode, or carpet cleaning mode), and the like, but it is not limited thereto.

According to an embodiment of the disclosure, a user may change a cleaning mode (e.g., quick mode or precise mode) of the robot cleaner 60 by using the input interface 1071. In addition, the user may set a cleaning area or designate a cleaning mode for a particular area by using the input interface 1071.

The charging terminal 1010 may include a conductor for electrical connection when the robot cleaner 60 is coupled to a station (not shown) of the robot cleaner 60.

Figure 2B:
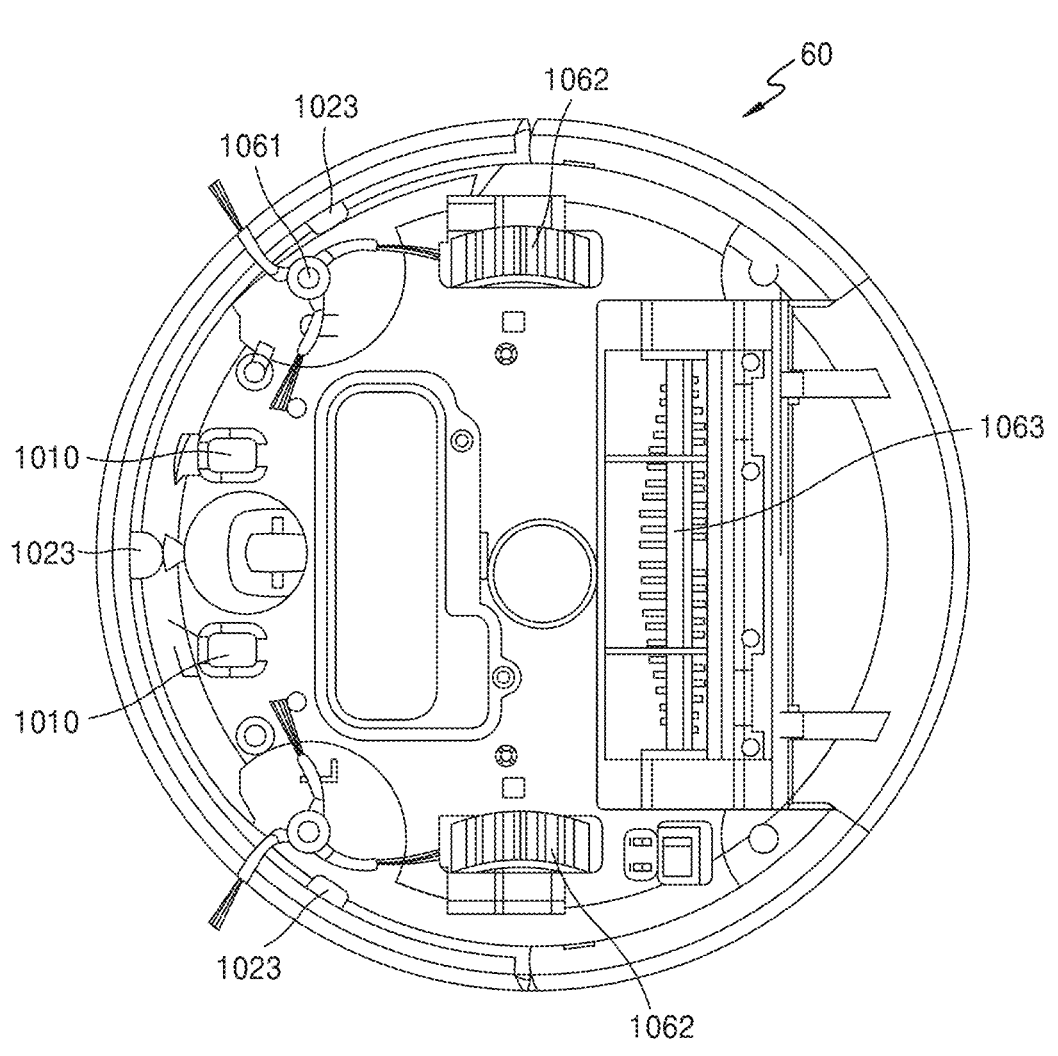
FIG. 2B is a diagram for describing a structure of a lower surface of the robot cleaner as a mobile device, according to an embodiment of the disclosure.

FIG. 2B is a diagram for describing a structure of a lower surface of a robot cleaner as a mobile device, according to an embodiment of the disclosure.

Referring to FIG. 2B, the robot cleaner 60 may include, but is not limited to, the charging terminal 1010, a fall prevention sensor 1023, side rotating brushes 1061, driving wheels 1062, and a power brush 1063.

The charging terminal 1010 is for electrically connecting the robot cleaner 60 to the station (not shown). FIG. 2B illustrates a case in which the charging terminal 1010 is installed on the bottom surface of the robot cleaner 60, unlike in FIG. 2A.

The fall prevention sensor 1023 is for detecting the robot cleaner 60 reaching a point where it may fall while performing autonomous cleaning, so as to prevent the robot cleaner 60 from falling. The side rotating brushes 1061 may be used to sweep away dust from a floor while the robot cleaner 60 autonomously moves and performs cleaning. The driving wheels 1062 may be used for movement when the robot cleaner 60 moves to perform cleaning. The power brush 1063 may be used to suck in dust while the robot cleaner 60 autonomously moves and performs cleaning. The power brush 1063 may be simply referred to as a brush. Although not illustrated in FIG. 2B, the robot cleaner 60 may include a suction motor therein to suck in dust through the power brush 1063. "Dust" can refer to any type of particle or debris capable of being sucked into the robot cleaner 60, which can include dirt, hair, fur, pollen, crumbs, and other such material. Other functions of the components may be intuitively inferred by those of skill in the art from their names, and thus, detailed descriptions thereof will be omitted.

Figure 3A:
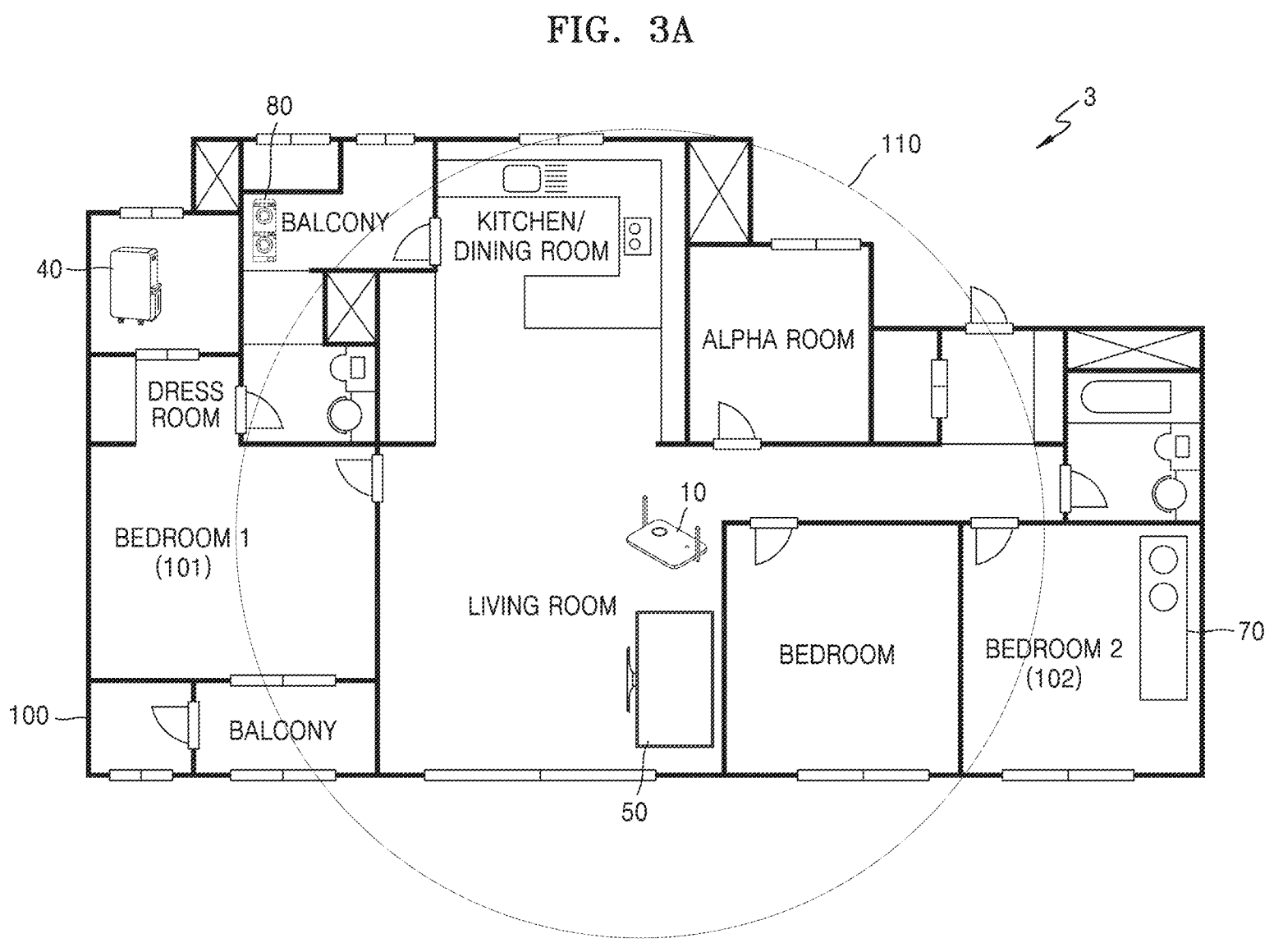

FIG. 3A is a plan view illustrating an electronic device located in an insufficient wireless coverage area inside a home, according to an embodiment of the disclosure.

Referring to FIG. 3A, the wireless router 10 is often located in a living room together with the TV 50, inside a home 3. FIG. 3A illustrates wireless connection coverage

110 around the wireless router 10. In the home 3, the wireless connection coverage 110 of the wireless router 10 does not cover an area near a dressing room in a bedroom 1 101, and part of a bedroom 2 102 where the air conditioner 70 is located. Thus, wireless communication with the dehumidifier 40 installed to remove moisture in the dressing room, and the air conditioner 70 installed in the bedroom 2 102 may be unavailable or the communication strength may be weak. Thus, referring to FIG. 3A, it may be seen that there is an insufficient wireless coverage area inside the home, and electronic devices placed in the insufficient wireless coverage area inside the home may be in a poor communication state in which communication connection is unavailable or communication is not performed well even when communication connection is established. In order to solve such an insufficient wireless coverage area inside a home, for example, an additional wireless router or an extension router may be installed in the bedroom 1 101, but this incurs additional costs. Thus, there is a need to enable wireless communication of electronic devices placed in an insufficient wireless coverage area inside a home without incurring additional costs.

Figure 3B:
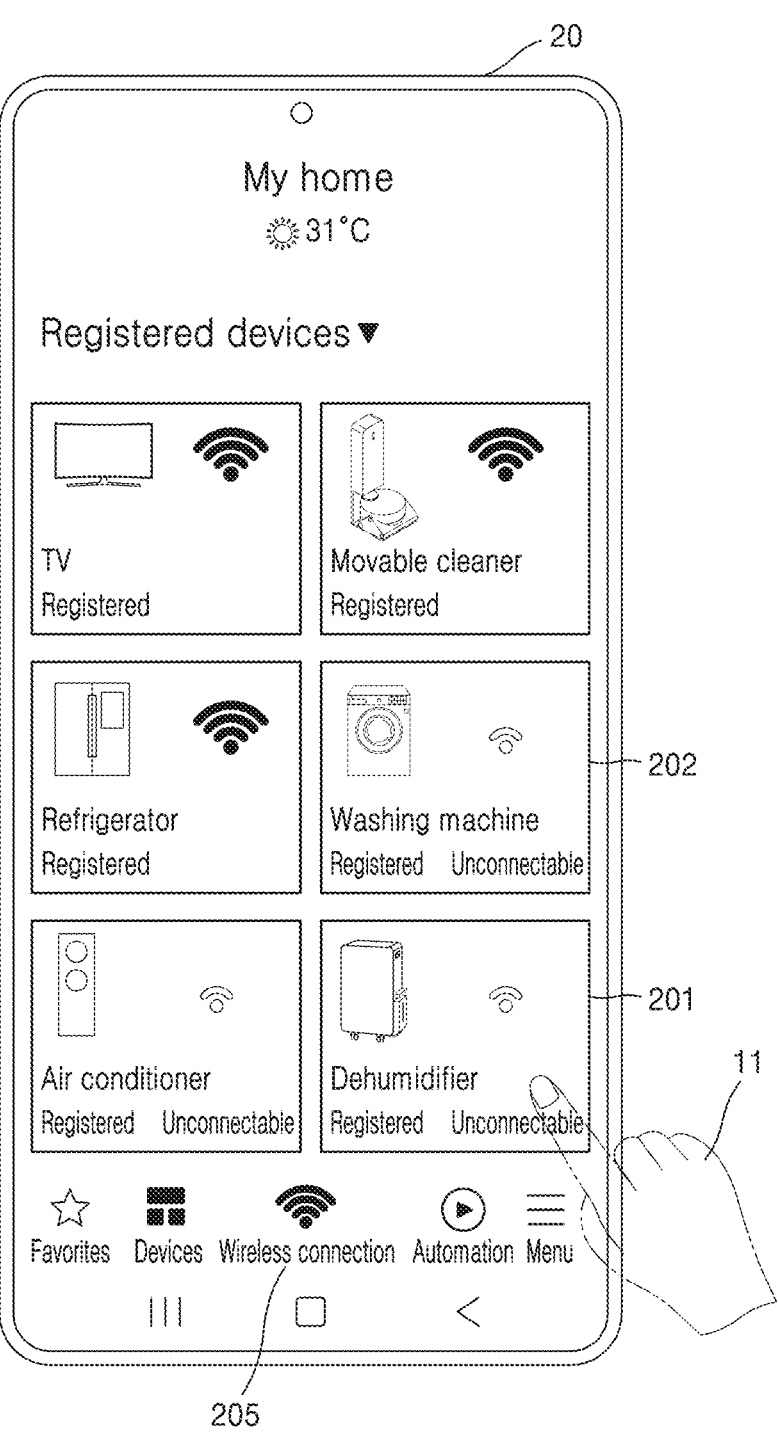
FIG. 3B is a diagram illustrating a user terminal displaying a network connection state of an electronic device inside a home, according to an embodiment of the disclosure.

FIG. 3B is a diagram illustrating a user terminal displaying a network connection state of an electronic device inside a home, according to an embodiment of the disclosure.

When an application for controlling electronic devices inside a home is executed on the user terminal 20, a screen as illustrated in FIG. 3B may be displayed. The screen on which the application is executed as illustrated in FIG. 3B is merely an example, and the screen displayed when the user terminal 20 executes the application for controlling electronic devices inside a home may appear in various forms. For example, when the application for controlling electronic devices inside a home is executed, a screen may be displayed in which registered devices that have been connected inside the home are arranged around a gateway device such as the wireless router 10, as illustrated in FIG. 1A.

As illustrated in FIG. 3B, all electronic devices that have been previously registered before executing the application can be displayed on the screen. In FIG. 3B, a TV, a movable cleaner, a refrigerator, a washing machine, an air conditioner, a dehumidifier, and the like are displayed as pre-registered devices. Here, the washing machine, the air conditioner, and the dehumidifier among the pre-registered electronic devices, a message of 'unconnectable' or 'difficult to connect to' is displayed on the user terminal 20 for various reasons (e.g., because they are located in an insufficient wireless coverage area inside the home). In an embodiment of the disclosure, as illustrated in FIG. 3B, a wireless connection signal strength indication may be displayed on an icon corresponding to each electronic device, to indicate that the electronic device among the pre-registered electronic devices is currently not connected for wireless communication or has a low wireless communication connection strength, and thus, wireless communication connection is not actually performed properly. By displaying the wireless connection signal strength corresponding to each electronic device and/or displaying the message of 'unconnectable', the user may easily identify electronic devices that are currently difficult to wirelessly connect to. In an embodiment of the disclosure, referring to FIG. 3B, the user terminal 20 is able to communicate with the wireless router 10, and thus, the electronic devices displayed as 'unconnectable' may be electronic devices for which wireless connection with the wireless router 10 is unavailable.

According to an embodiment of the disclosure, in order to establish wireless connection with an electronic device that is currently difficult to wirelessly connect to or has a low wireless connection signal strength, a user 11 may touch, on the user terminal 20, an icon 201 corresponding to an electronic device with which wireless connection is desired, for example, a dehumidifier. Such a wireless connection command of the user 11 on the user terminal 20 is merely an example, and a wireless connection command of the user 11 may be in various forms. In an embodiment of the disclosure, the user 11 may input a wireless connection command to the user terminal 20 through voice, such as 'Connect wirelessly to the dehumidifier'.

According to an embodiment of the disclosure, after selecting the dehumidifier as an electronic device to be wirelessly connected in the above embodiment, the user 11 may additionally select an electronic device to be wirelessly connected, in order to establish wireless connection with another electronic device that is currently difficult to wirelessly connect to or has a low wireless connection signal strength. For example, when the user 11 selects, for wireless connection, the icon 201 corresponding to the dehumidifier, the user terminal 20 may display a message stating, "Would you like to select an additional connection target?" on the screen, and as illustrated in FIG. 3B, may present a screen that displays the registered device again to the user. Here, the icon 201 corresponding to the dehumidifier that has been selected as a wireless connection target may be displayed in a shape and/or color to be distinguished from other icons.

In an embodiment of the disclosure, electronic devices to be wirelessly connected may be sequentially selected as in the above embodiment, and the user 11 may attempt wireless connection by selecting a plurality of icons corresponding to the electronic devices to be wirelessly connected on the screen as illustrated in FIG. 3B. For example, when the user 11 selects the icon 201 corresponding to the dehumidifier, the icon 201 corresponding to the dehumidifier is displayed in a different shape and/or color from other icons, and when the user 11 touches an icon 202 corresponding to a washing machine so as to additionally select, as a wireless connection target, the washing machine, which is an electronic device that cannot currently be connected, the icon 202 corresponding to the washing machine may be displayed in a different shape, different texture, and/or different color from other icons.

In an embodiment of the disclosure, when selection of icons corresponding to electronic devices to be wirelessly connected is completed, the user 11 may touch a wireless connection icon 205 to perform wireless connection with the selected electronic devices. According to an embodiment of the disclosure, when the wireless connection icon 205 is selected, the mobile device 1000 may move near the selected electronic device and then attempt wireless connection according to a wireless connection command from the user terminal 20. The wireless connection command from the user terminal 20 may be directly transmitted to the mobile device 1000 through a wireless network, or may be transmitted to the mobile device 1000 through the wireless router 10.

In an embodiment of the disclosure, the wireless connection command received by the mobile device 1000 may include identification information (e.g., a medium access control (MAC) address) of the selected electronic device. In an embodiment of the disclosure, optionally, the wireless connection command may also include position information of the selected electronic device. In an embodiment of the disclosure, the position information of the selected electronic device may be transmitted to the mobile device 1000 as data separate from the wireless connection command. The identification information and/or the position information of the electronic device may be pre-stored in a memory of the user terminal 20 or a memory of the wireless router 10. Before describing FIGS. 3C and 3D, FIGS. 4 and 5 will first be referred to for describing the mobile device 1000 moving to establish wireless connection with an electronic device inside a home.

In an embodiment of the disclosure, after the user 11 selects, on an application, an icon corresponding to an electronic device to be wirelessly connected to perform wireless connection, and the wireless connection is performed, the mobile device 1000 may automatically perform wireless connection with the electronic device afterwards. In other words, the mobile device 1000 may automatically perform wireless connection with electronic devices to be wirelessly connected, without the user 11 having to manually select again an electronic device to be wirelessly connected on the application one by one. Here, a triggering operation in which the mobile device 1000 performs wireless connection with an electronic device to be wirelessly connected may be performed in various manners. For example, the mobile device 1000 may first establish wireless connection with an electronic device in an insufficient wireless coverage area inside the home, and then move periodically (e.g., every 12 hours) to establish wireless connection with the same electronic device. Alternatively, when the application determines that wireless connection between the electronic device and the wireless router 10 is unavailable, the mobile device 1000 may move to the insufficient wireless coverage area in order to establish wireless connection with the electronic device. Here, a triggering event that causes the mobile device 1000 to move may be a 'wireless connection strength'. In other words, a case in which the 'wireless connection strength' is less than or equal to a predetermined strength may be a triggering event that causes the mobile device 1000 to move. When it is determined that the electronic device is consistently in the insufficient wireless coverage area inside the home, the mobile device 1000 may move near the electronic device too frequently, and thus, even when the 'wireless connection strength' corresponds to the triggering event, the most recent time when the mobile device 1000 was near the electronic device or the time elapsed after the mobile device 1000 was near the electronic device may also be considered. For example, even when the 'wireless connection strength' is less than or equal to the predetermined strength and thus wireless connection is necessary, but a predetermined period of time has not elapsed yet after the mobile device 1000 visited the electronic device in the insufficient wireless coverage area, there may not be much updated data that needs to be received, and thus, the mobile device 1000 may move near the electronic device located in the insufficient wireless coverage area inside the home after a predetermined period of time (e.g., 5 hours) has elapsed.

In an embodiment of the disclosure, when the electronic device to be wirelessly connected is located in the insufficient wireless coverage area inside the home according to an initial setting, without executing the application and a selection by the user 11 as illustrated in FIG. 3B, the mobile device 1000 may move to the electronic device located in the insufficient wireless coverage area inside the home. In other words, the mobile device 1000 may automatically perform wireless connection with the electronic device to be wirelessly connected, based on a triggering event according to a setting without the user 11 having to execute the application and select the electronic device to be wirelessly connected. Here, a triggering operation in which the mobile device 1000 performs wireless connection with an electronic device to be wirelessly connected may be performed in various manners. For example, the mobile device 1000 may move periodically (e.g., every 12 hours) to establish wireless connection with an electronic device in an insufficient wireless coverage area inside the home. Alternatively, when the mobile device 1000 determines that the electronic device is in an insufficient wireless coverage area inside the home where wireless connection is unavailable, the mobile device 1000 may move to establish wireless connection with the electronic device. Here, a triggering event that causes the mobile device 1000 to move may be a 'wireless connection strength'. In other words, a case in which the 'wireless connection strength' is less than or equal to a predetermined strength may be a triggering event that causes the mobile device 1000 to move. When it is determined that the electronic device is consistently in the insufficient wireless coverage area inside the home, the mobile device 1000 may move near the electronic device too frequently, and thus, even when the 'wireless connection strength' corresponds to the triggering event, the most recent time when the mobile device 1000 was near the electronic device or the time elapsed after the mobile device 1000 was near the electronic device may also be considered. For example, even when the 'wireless connection strength' is less than or equal to the predetermined strength and thus wireless connection is necessary, but a predetermined period of time has not elapsed yet after the mobile device 1000 visited the electronic device in the insufficient wireless coverage area inside the home, there may not be much updated data that needs to be received, and thus, the mobile device 1000 may move to the electronic device in the insufficient wireless coverage area inside the home after a predetermined period of time (e.g., 4 hours) has elapsed.

Figure 4:
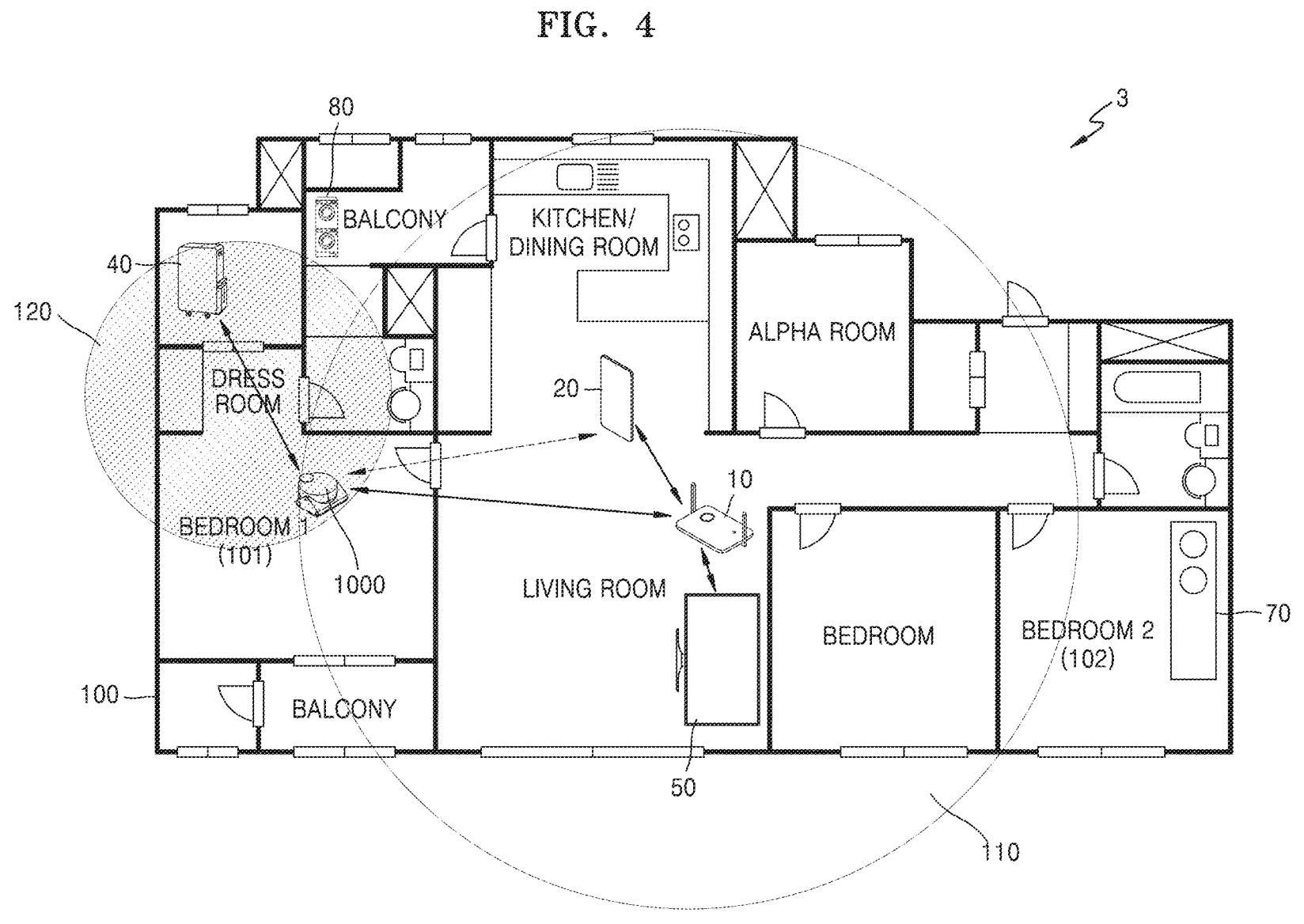

FIG. 4 is a diagram illustrating the mobile device 1000 moving near an electronic device and performing wireless connection, according to an embodiment of the disclosure.

FIG. 4 illustrates the mobile device 1000 moving near an electronic device in the home 3. According to an embodiment of the disclosure, then the wireless connection icon 205 is selected on the user terminal 20 in FIG. 3B, the mobile device 1000 moves near an electronic device (e.g., the dehumidifier 40) selected for wireless connection on the user terminal 20 and then attempts wireless connection, according to a wireless connection command from the user terminal 20. The wireless connection command from the user terminal 20 may be directly transmitted to the mobile device 1000 through a wireless network, or may be transmitted from the user terminal 20 to the mobile device 1000 through the wireless router 10 as illustrated in FIG. 4.

The mobile device 1000 having received the wireless connection command moves near the electronic device to be wirelessly connected within a predetermined distance. In FIG. 4, when the user terminal 20 transmits a wireless connection command to the mobile device 1000 to establish wireless connection with the dehumidifier 40, the mobile device 1000 may move near the dressing room where the dehumidifier 40 is located. This is only an example, and in the absence of information about the position of the dehumidifier 40, the mobile device 1000 may attempt to establish wireless connection with the dehumidifier 40 based on identification information of the dehumidifier 40, while moving all around inside the home 3. The mobile device 1000 may establish wireless connection with the dehumidifier 40 within a wireless connection coverage 120 of the mobile device 1000, near the dressing room where the dehumidifier 40 is located. The wireless connection may be BLE connection or WFD connection. When the user 11 wants to establish wireless connection with both the washing machine/dryer 80 and the air conditioner 70 that are outside the wireless connection coverage 110 of the wireless router 10, the mobile device 1000 may move near the washing machine/dryer 80 and the air conditioner 70 to establish wireless connection.

In an embodiment of the disclosure, the mobile device 1000 may have obtained position information of the dehumidifier 40 in order to move for wireless connection with the dehumidifier 40, which is a wireless connection target. There are several ways for the mobile device 1000 to obtain the position information of the dehumidifier 40 that is a wireless connection target. In an embodiment of the disclosure, the mobile device 1000 may store map information containing the positions of all electronic devices in the home, before receiving a wireless connection command. Map information about electronic devices will be described with reference to FIG. 5.

Figure 5:
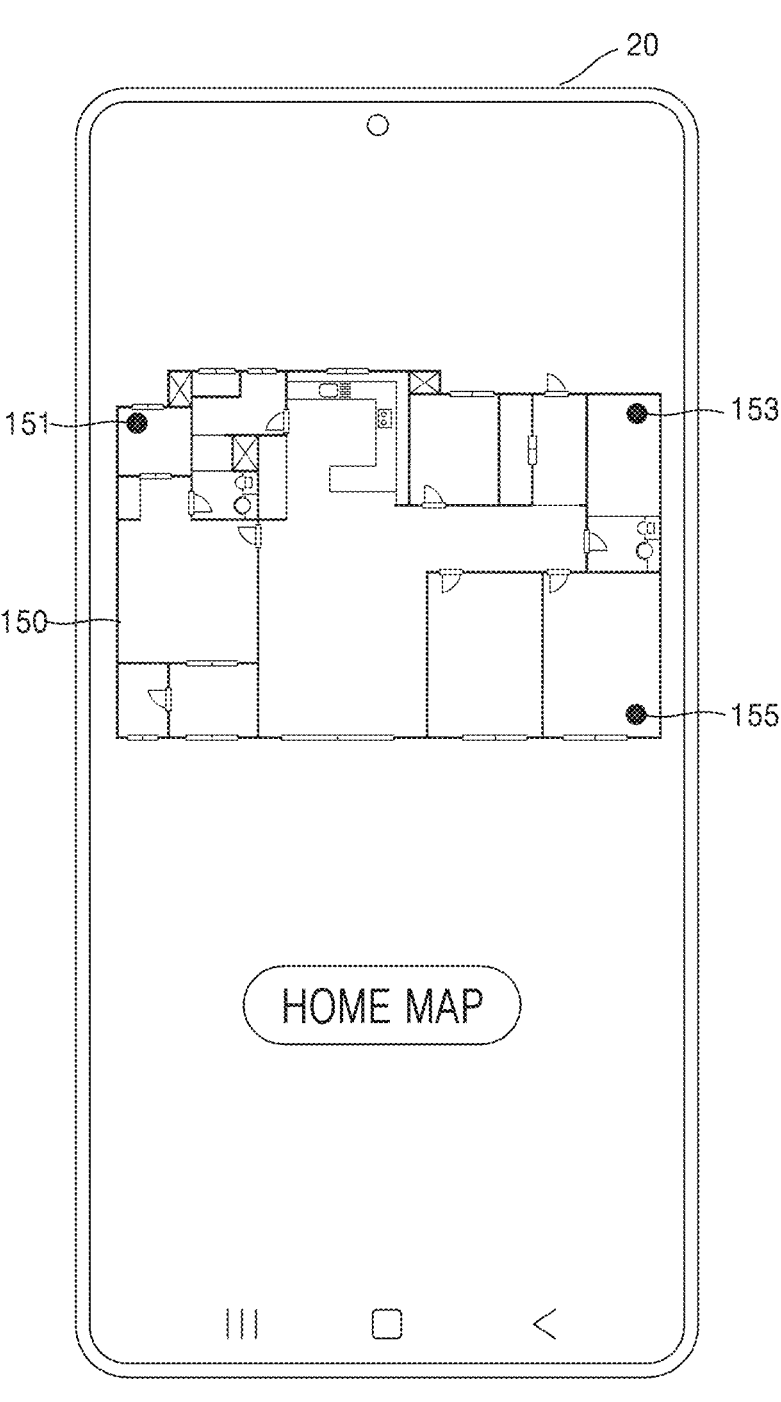
FIG. 5 illustrates home map information according to an embodiment of the disclosure.

FIG. 5 illustrates home map information according to an embodiment of the disclosure.

The mobile device 1000 is a mobile device that moves inside a home, and thus may generate home map information while moving. In an embodiment of the disclosure, in a case in which the mobile device 1000 is a robot cleaner, the robot cleaner may store a home map 150 as illustrated in FIG. 5 in its memory, for cleaning the home. The home map 150 may be referred to as information about a home map. The robot cleaner may separately display an area where cleaning is possible or an area where cleaning has been performed, on the home map 150.

The home map 150 is cleaning map information indicating a result of the mobile device 1000 performing its role as a robot cleaner, and according to an embodiment of the present disclosure, the home map 150 may also store information about points 151, 153, and 155 of connection with particular electronic devices (e.g., home appliances) inside the home.

For example, the mobile device 1000 may include, in the home map 150, a history of wireless connection with the dehumidifier 40 at the point 151 of the home map 150, and store it. Here, identification information (e.g. a MAC address) of the dehumidifier 40 and/or information about a time of connection with the dehumidifier 40 may also be included. For example, the mobile device 1000 may include, in the home map 150, a history of wireless connection with the washing machine/dryer 80 at the point 153 of the home map 150, and a history of wireless connection with the air conditioner 70 at the point 155 of the home map 150, and store them in the memory. In this way, the home map 150 may include position information about where each electronic device is located in the home.

In an embodiment of the disclosure, in addition to the information about the points 151, 153, and 155 of connection with particular electronic devices inside the home, the home map 150 may also include wireless connection strength information for each electronic device, which indicates a current wireless connection strength with a particular electronic device inside the home.

In an embodiment of the disclosure, because the home map 150 includes a wireless connection signal strength for each of a plurality of electronic devices, and each wireless connection signal strength may change over time, the home map 150 may be updated based on a predetermined time interval or event. The event may be, for example, powering on the user terminal 20 or executing a relevant application. In an embodiment of the disclosure, the event may be a command for the robot cleaner 60 to start cleaning, or the robot cleaner 60 being powered on.

Methods by which the mobile device 1000 identifies the positions of electronic devices inside a home include providing position information through the user terminal 20 when the user 11 inputs a wireless connection command. A case in which the user 11 provides, through the user terminal 20, position information of an electronic device to be wirelessly connected will be described with reference to FIG. 3C.

Figure 3C:
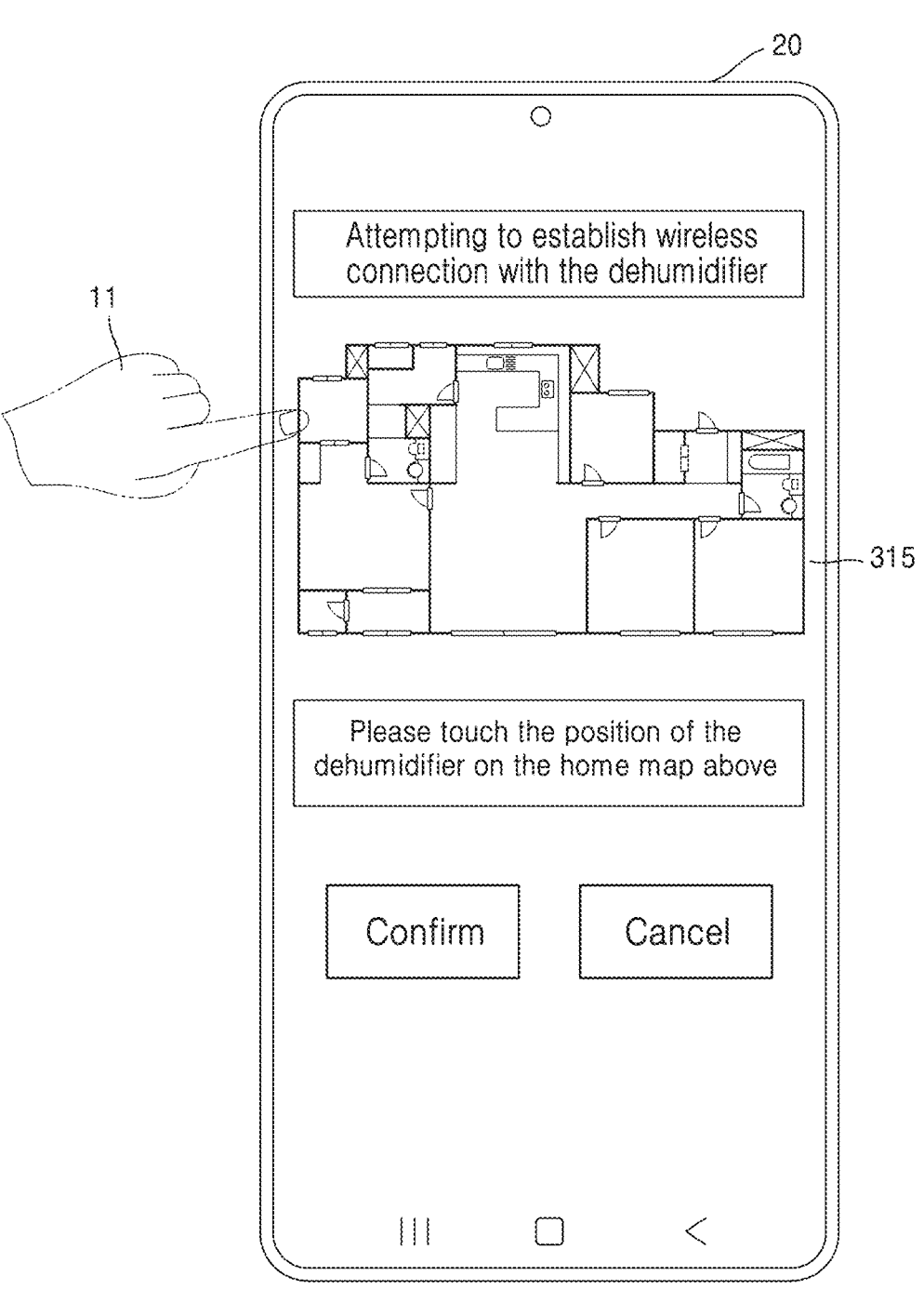
FIG. 3C is a diagram illustrating that position information of an electronic device to be wirelessly connected is specified by using a user terminal, according to an embodiment of the disclosure.

FIG. 3C is a diagram illustrating that position information of an electronic device to be wirelessly connected is specified by using a user terminal, according to an embodiment of the disclosure.

In FIG. 3B, when the user 11 selects the icon 201 corresponding to the dehumidifier 40 as a wireless connection target, the user terminal 20 may display a home map 315 as illustrated in FIG. 3C on the screen to provide position information of the dehumidifier 40 to the mobile device 1000. Referring to FIG. 3C, when the user 11 selects the dehumidifier 40 as a wireless connection target in FIG. 3B, the user terminal 20 may provide the user 11 with the home map 315 and display an indication stating, "Attempting to establish wireless connection with the dehumidifier.", and an indication stating, "Please touch the position of the dehumidifier on the home map above", as illustrated in FIG. 3C. The user 11 may touch the point where the dehumidifier 40 is located on the home map 315 and press 'Confirm' to determine the dehumidifier 40 as a wireless connection target device, and also specify the position of the dehumidifier 40. Alternatively, when the user is not sure about the position information of the dehumidifier 40, the process of specifying the position information may be omitted by pressing a 'Cancel' button. In this case, the mobile device 1000 cannot identify the position of the dehumidifier 40, and thus may attempt to establish wireless connection with the dehumidifier 40 while moving inside the entire home.

When the user 11 specifies the position of the dehumidifier 40 on the home map 315, the corresponding position information may be provided to the mobile device 1000. The mobile device 1000 may determine the position of the dehumidifier 40 based on the home map 150 stored in the memory and the received position information, and start moving to the point where the dehumidifier 40 is located.

In an embodiment of the disclosure, when the user 11 selects a plurality of electronic devices to be wirelessly connected, the mobile device 1000 may set movement paths for moving the shortest distances to the selected plurality of electronic devices to be wirelessly connected, based on position information of the selected plurality of electronic devices to be wirelessly connected. Based on the set shortest movement paths, the mobile device 1000 may move to the plurality of selected electronic devices to be wirelessly connected.

Assume that the mobile device 1000 does not store position information of a selected electronic device to be wirelessly connected, and neither the user terminal 20 nor the wireless router 10 provides the mobile device 1000 with position information of the electronic device to be wirelessly connected. In this case, the mobile device 1000 may attempt to establish wireless connection with the selected electronic device while moving all around inside the home. In other words, in a state in which the position information of the electronic device to be wirelessly connected is not determined, the mobile device 1000 may attempt to establish wireless connection with the selected electronic device while moving all around inside the home. When attempting to establish wireless connection with the selected electronic device to be wirelessly connected while moving all around inside the home, the mobile device 1000 may identify the electronic device to be wirelessly connected based on identification information of the electronic device to be wirelessly connected, and then perform wireless connection.

Figure 3D:
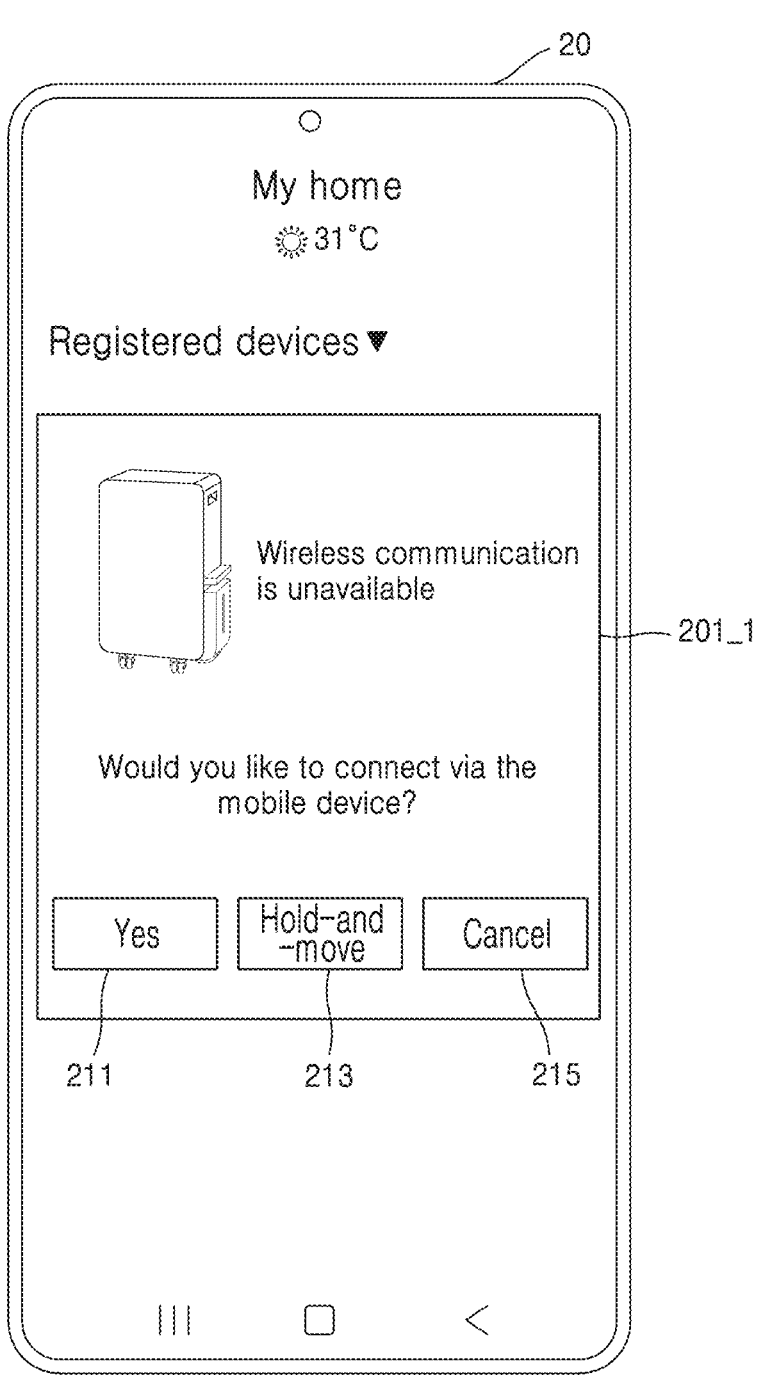
FIG. 3D is a diagram illustrating a user interface for moving a mobile device to an electronic device to be wirelessly connected to by using a user terminal, according to an embodiment of the disclosure.

FIG. 3D is a diagram illustrating a user interface for moving a mobile device to an electronic device to be wirelessly connected, by using a user terminal, according to an embodiment of the disclosure.

When an application for controlling electronic devices inside a home is executed on the user terminal 20, as illustrated in FIG. 3D, the user terminal 20 may provide a user interface for wireless connection with an electronic device for which wireless connection is unavailable. When the user terminal 20 executes the application for controlling electronic devices inside a home, wireless connection with the dehumidifier 40 is unavailable, and thus, the user terminal 20 displays a message stating, "Wireless connection is unavailable. Would you like to connect via the mobile device?" on a guide screen 201_1 corresponding to the dehumidifier 40. When the user 11 touches a 'Yes' button 211, a wireless connection command is transmitted directly from the user terminal 20 to the mobile device 1000, or from the user terminal 20 to the mobile device 1000 through the wireless router 10, and thus, the mobile device 1000 moves to the position where the dehumidifier 40 is located, for wireless connection.

In an embodiment of the disclosure, when the user 11 touches a cancel button 215, wireless connection is not attempted with the electronic device located in the insufficient wireless coverage area inside the home.

In an embodiment of the disclosure, when the user 11 touches a hold-and-move button 213, the user 11 intends to establish wireless connection between the user terminal 20 and the dehumidifier 40 by carrying the user terminal 20 in vicinity of the dehumidifier 40. Thus, in this case, the mobile device 1000 does not move, but the user 11 holding the user terminal 20 may move near the dehumidifier 40 such that wireless connection between the user terminal 20 and the dehumidifier 40 is established. In this case, when the user terminal 20 stores the position information of the dehumidifier 40 in the memory, the user terminal 20 may display the position information of the dehumidifier 40 on the screen.

An embodiment of the disclosure will be described with reference to FIG. 6A, in which the user terminal 20 displays the position information of the dehumidifier 40 on the screen when the user 11 touches the hold-and-move button 213.

Figure 6A:
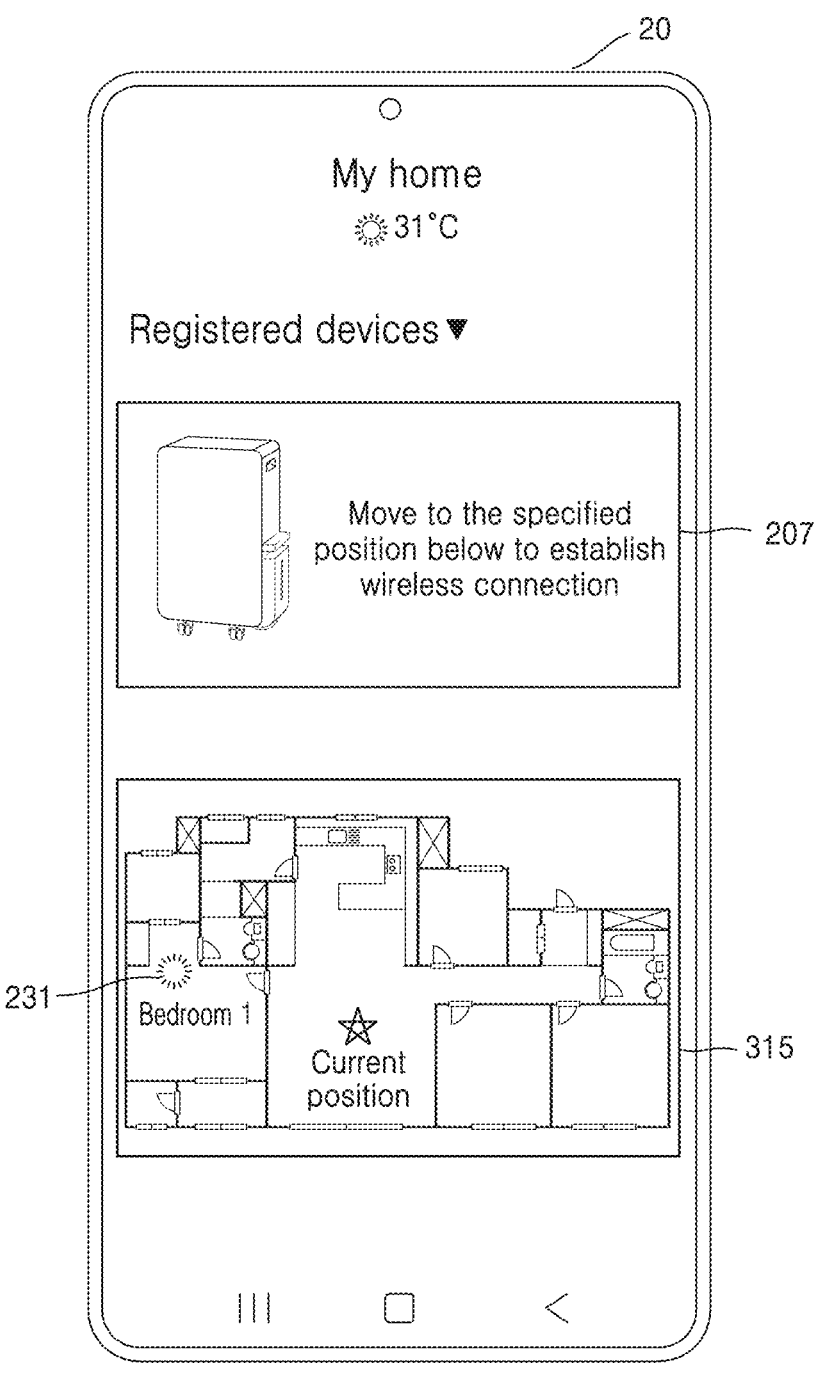
FIG. 6A is a diagram illustrating a user terminal displaying a position of an electronic device to be wirelessly connected, according to an embodiment of the disclosure.

FIG. 6A is a diagram illustrating a user terminal displaying the position of an electronic device to be wirelessly connected, according to an embodiment of the disclosure.

In FIG. 3D, when the user 11 touches the hold-and-move button 213, the user terminal 20 may display the position of the electronic device to be connected inside the home as illustrated in FIG. 6A, according to an embodiment of the disclosure. Referring to FIG. 6A, the position of the dehumidifier 40 is at a point 231 on the home map 315, and the user 11 may estimate a path to visit the dehumidifier 40 based on a current position indication. The user terminal 20 may optionally display, on the screen, a guide message 207 stating, "Move to the specified position below for wireless connection".

Figure 6B:
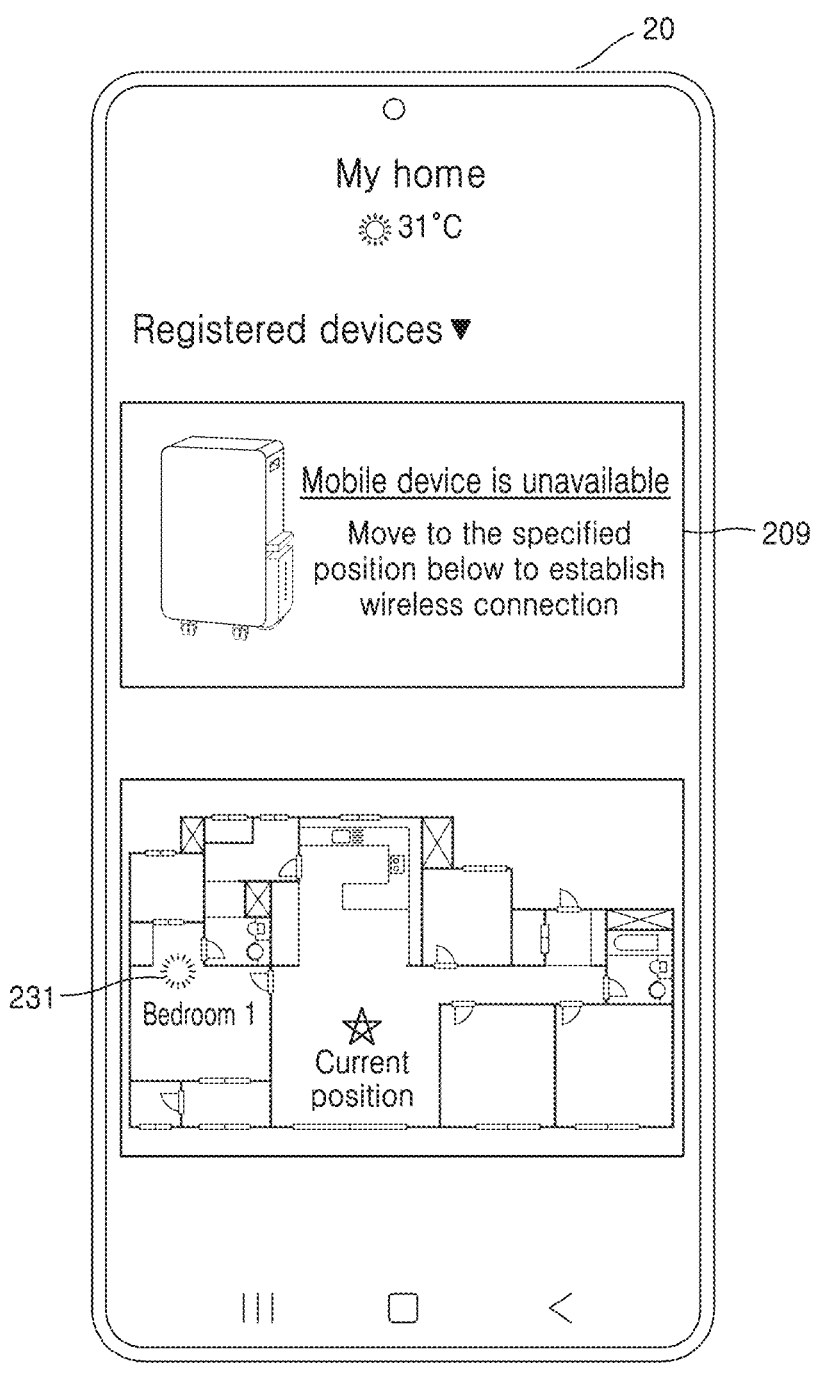
FIG. 6B is a diagram illustrating that a user is guided through the position of an electronic device to be connected when a mobile device is unavailable, according to an embodiment of the disclosure.

FIG. 6B is a diagram illustrating that a user is guided through the position of an electronic device to be connected, when a mobile device is unavailable, according to an embodiment of the disclosure.

In FIG. 3D, when the user 11 touches the 'Yes' button 211 to move the mobile device 1000 for wireless connection with the electronic device to be connected, but the mobile device 1000 is unavailable for some reason, the user terminal 20 may display a screen as illustrated in FIG. 6B, according to an embodiment of the disclosure. Because the mobile device 1000 is unavailable, the user terminal 20 may request the user 11 to move to the electronic device to be connected. To this end, the user terminal 20 may display, on the screen, a position 231 to which the user 11 holding the user terminal 20 is to move for connection with the dehumidifier 40, with a notice 209 stating, "Mobile device is unavailable" and "Move to the specified position below".

There may be several cases in which the mobile device 1000 is unavailable. For example, the mobile device 1000 may be wirelessly connected to the wireless router 10 (or the user terminal 20) but may be unable to move. For example, the mobile device 1000 is the robot cleaner 60 and is able to communicate with the wireless router 10, but may be unable to move when the battery power is not sufficiently charged for movement. Alternatively, there may be a case in which the mobile device 1000 was able to communicate with the wireless router 10 (or the user terminal 20) until just before, but the communication is unavailable as the mobile device 1000 momentarily enters a communication-disabled area. Alternatively, there may be a case in which the mobile device 1000 is unable to move for a while because it is performing other internal tasks (e.g., software update or battery charging).

Figure 7:
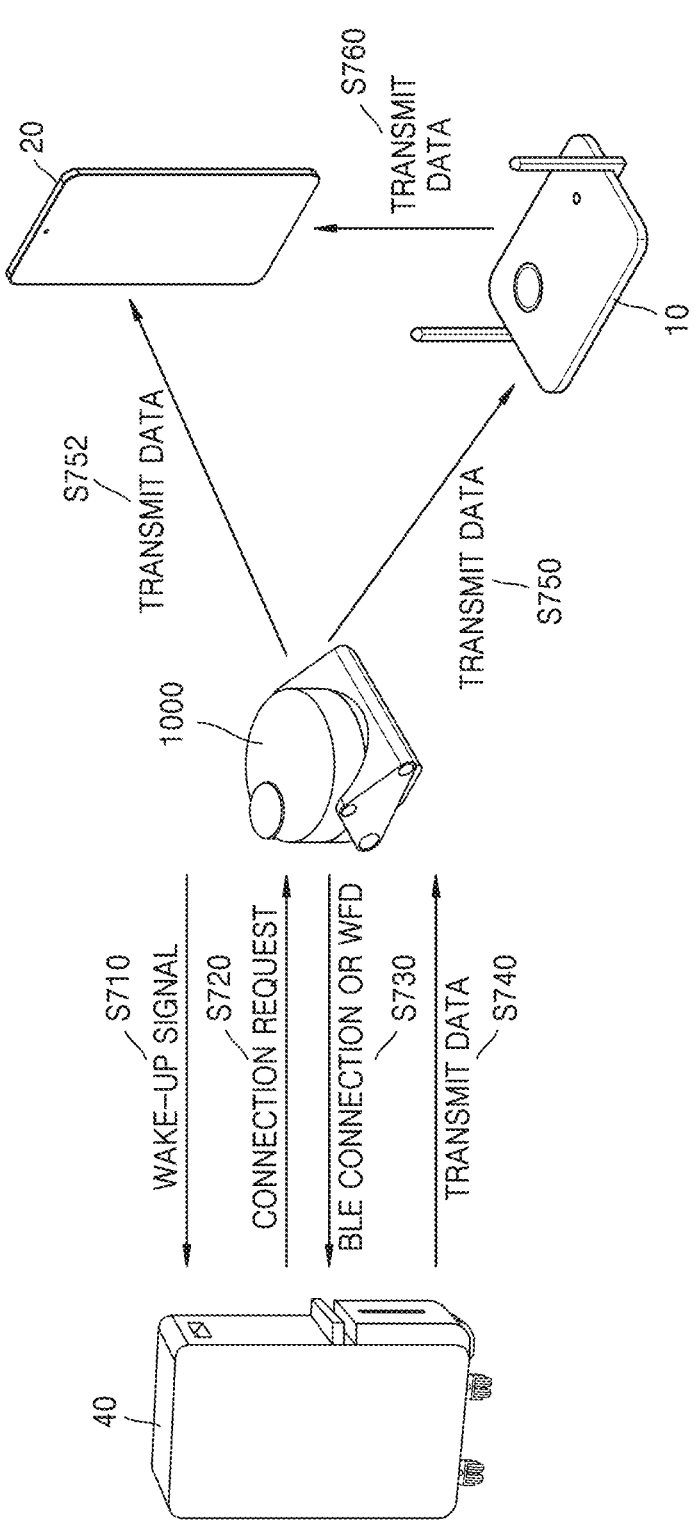
FIG. 7 is a diagram illustrating wireless connection established between an electronic device and a mobile device in an insufficient wireless coverage area inside a home, according to an embodiment of the disclosure.

FIG. 7 is a diagram illustrating wireless connection established between an electronic device and a mobile device in an insufficient wireless coverage area inside a home, according to an embodiment of the disclosure.

In FIG. 7, the dehumidifier 40 is located in an insufficient wireless coverage area inside the home, where communication connection with the wireless router 10 is unavailable. In an embodiment of the disclosure, the user terminal 20, which is connected to the wireless router 10 for wireless communication, desires to issue an operation command to the dehumidifier 40 or to receive data about the state of the dehumidifier 40, through an in-home network. Thus, the user terminal 20 may transmit a movement command to the mobile device 1000 such that the mobile device 1000 moves to the insufficient wireless coverage area inside the home where the dehumidifier 40 is located. The movement command may correspond to the 'wireless connection command' described above with reference to FIGS. 3B, 3D, 4, and 5 of the disclosure. The mobile device 1000 having received the movement command may move to the insufficient wireless coverage area inside the home where the dehumidifier 40 is located. The mobile device 1000 may be, but is not limited to, a movable robot cleaner. In addition, for example, in a case in which the home is a particular spatially limited place for a business, the mobile device 1000 may be a mobile robot. An example is illustrated in FIG. 17A.

Figure 17A:
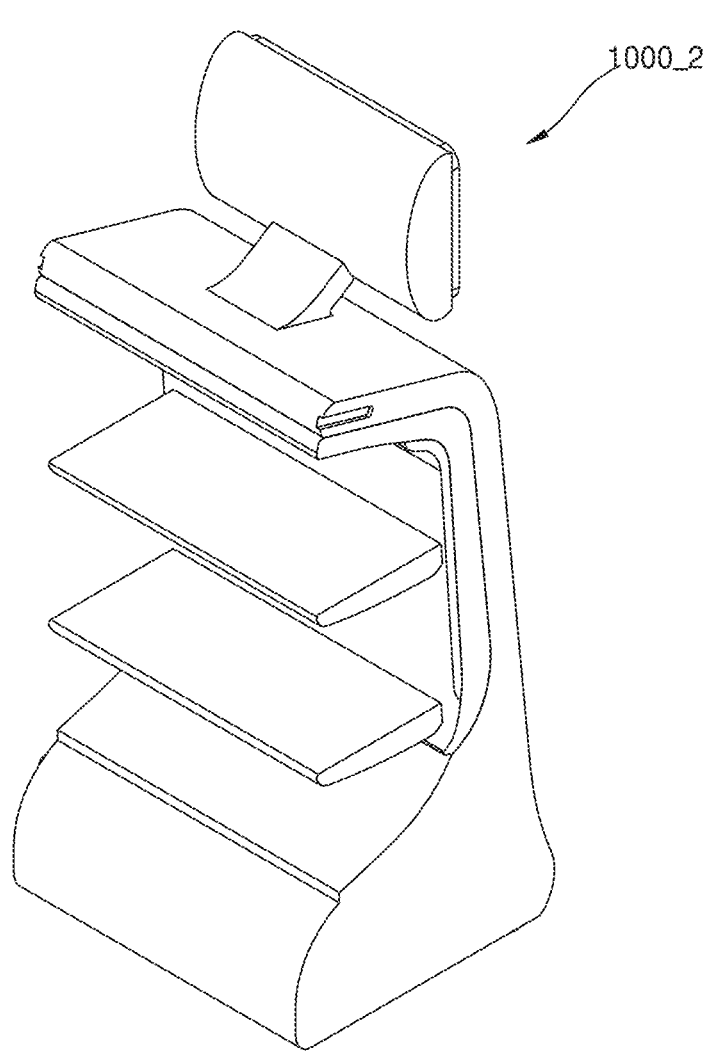
FIG. 17A illustrates a serving robot as a mobile device according to an embodiment of the disclosure.

FIG. 17A illustrates a serving robot as a mobile device according to an embodiment of the disclosure.

A serving robot 1000_2 is a device that moves all around inside a restaurant or similar environment, which is a particular spatially limited place for a business, and thus may serve as the mobile device 1000 according to an embodiment of the disclosure. The serving robot 1000_2 serving as the mobile device 1000 continuously moves inside the restaurant even without the user terminal 20 issuing a movement command to move near an electronic device located in an insufficient wireless coverage area inside the restaurant. Thus, when the serving robot 1000_2 moves near an electronic device located in the insufficient wireless coverage area inside the restaurant, the serving robot 1000_2 may establish wireless connection with the electronic device and receive data from the electronic device or transmit a particular command to the electronic device. The particular command transmitted to the electronic device in the insufficient wireless coverage area inside the restaurant may be a command that the serving robot 1000_2 has previously received from another device (e.g., the user terminal 20) constituting a network inside the restaurant.

Unlike a case in which the mobile device 1000 such as the robot cleaner 60 receives a movement command from the user terminal 20, and moves near an electronic device located in an insufficient wireless coverage area inside the home, there may be cases in which a device that moves inside a home periodically or frequently, such as the serving robot 1000_2, establishes wireless connection with an electronic device located in an insufficient wireless coverage area inside the home. For example, a cleaner device that is carried by a user while cleaning all around inside a home every day or once every few days corresponds to the cases. Such examples will be described again below with reference to FIGS. 10 and 17B.

Hereinafter, descriptions will be provided with reference to FIG. 7. In an embodiment of the disclosure, the movement command received by the mobile device 1000 from the user terminal 20 may be received directly from the user terminal 20 or through the wireless router 10. In an embodiment of the disclosure, the movement command from the user terminal 20 may include identification information of the electronic device to be wirelessly connected. In an embodiment of the disclosure, the movement command from the user terminal 20 may include position information of the electronic device to be wirelessly connected.

In an embodiment of the disclosure, in operation S710, the mobile device 1000, which has moved near the dehumidifier 40 for wireless connection, may transmit a wake-up signal to wake up the dehumidifier 40. It is optional for the mobile device 1000 to transmit the wake-up signal, and when the mobile device 1000 reaches the vicinity of the dehumidifier 40, which is an electronic device to be wirelessly connected, the mobile device 1000 may initiate a wireless connection process by receiving a connection request signal periodically broadcast by the dehumidifier 40. In other words, the mobile device 1000 may not transmit a wake-up signal, and the mobile device 1000 may initiate wireless connection only through the connection request signal broadcast by the electronic device located in the insufficient wireless coverage area inside the home.

In operation S720, the dehumidifier 40 may transmit a connection request signal to the mobile device 1000 in response to the wake-up signal of the mobile device 1000. In an embodiment of the disclosure, the connection request signal may include information indicating whether the dehumidifier 40 may be connected through BLE or WFD. In an embodiment of the disclosure, the BLE connection may be a simple BLE connection or BLE mesh network wireless connection. The connection request signal may not include information indicating whether a BLE connection is available, whether a BLE mesh network wireless connection is available, or whether a WFD connection is available. In this case, the mobile device 1000 and the dehumidifier 40 may establish wireless connection by using a pre-agreed communication method (e.g., BLE connection, BLE mesh network wireless connection, or WFD connection).

In operation S730, the mobile device 1000 may establish wireless connection with the dehumidifier 40 in response to the connection request signal or based on the connection request signal. When the connection request signal does not include information about a particular wireless connection method, the mobile device 1000 and the dehumidifier 40 may establish wireless connection by using a pre-agreed communication method. In an embodiment of the disclosure, when the connection request signal does not include information about a particular wireless connection method, the mobile device 1000 may attempt a BLE connection with the dehumidifier 40. When the BLE connection with the dehumidifier 40 fails, the mobile device 1000 may attempt a WFD connection. Alternatively, in the opposite order, the mobile device 1000 may attempt a WFD connection with the dehumidifier 40. When the WFD connection with the dehumidifier 40 fails, the mobile device 1000 may attempt a BLE connection (or specifically BLE mesh network wireless connection) with the dehumidifier 40 as an alternative.

When the connection request signal includes information about a particular wireless connection method, the mobile device 1000 may perform wireless connection with the dehumidifier 40 by using the wireless connection method included in the connection request signal. In an embodiment of the disclosure, when the connection request signal includes information that a BLE connection is available, the mobile device 1000 may perform the BLE connection with the dehumidifier 40. In an embodiment of the disclosure, when the connection request signal includes information that a WFD connection is available, the mobile device 1000 may perform the WFD connection with the dehumidifier 40. In an embodiment of the disclosure, when the connection request signal includes information that both a BLE connection and WFD connection are available, the mobile device 1000 may perform the BLE connection or WFD connection with the dehumidifier 40. In an embodiment of the disclosure, when the connection request signal includes information that all of the BLE connection, BLE mesh network wireless connection, and WFD connection are available, the mobile device 1000 may first attempt BLE connection with the dehumidifier 40, and when the BLE connection is not established, the mobile device 1000 may then perform the WFD connection. The BLE connection throughout the disclosure may include a BLE mesh network wireless connection.

In operation S740, the dehumidifier 40 may transmit or receive data to or from the mobile device 1000 based on the established wireless connection.

In operation S750, the mobile device 1000 may transmit, to the wireless router 10, the data received from the dehumidifier 40 such that other electronic devices may receive the data through the in-home network. Here, in operation S760, the user terminal 20 may receive the data transmitted by the mobile device 1000 in operation S750 through the wireless router 10. Alternatively, the mobile device 1000 may store the data received from the dehumidifier 40 and then transmit the data received from the dehumidifier 40 along with the identification information of the dehumidifier 40 to an electronic device inside the home, which requests the data. In operation S752, independently of operations S750 and S760, the mobile device 1000 may transmit the data received from the dehumidifier 40, directly to the user terminal 20, which has transmitted a movement command to the mobile device 1000 to move near the dehumidifier 40.

Figure 8:
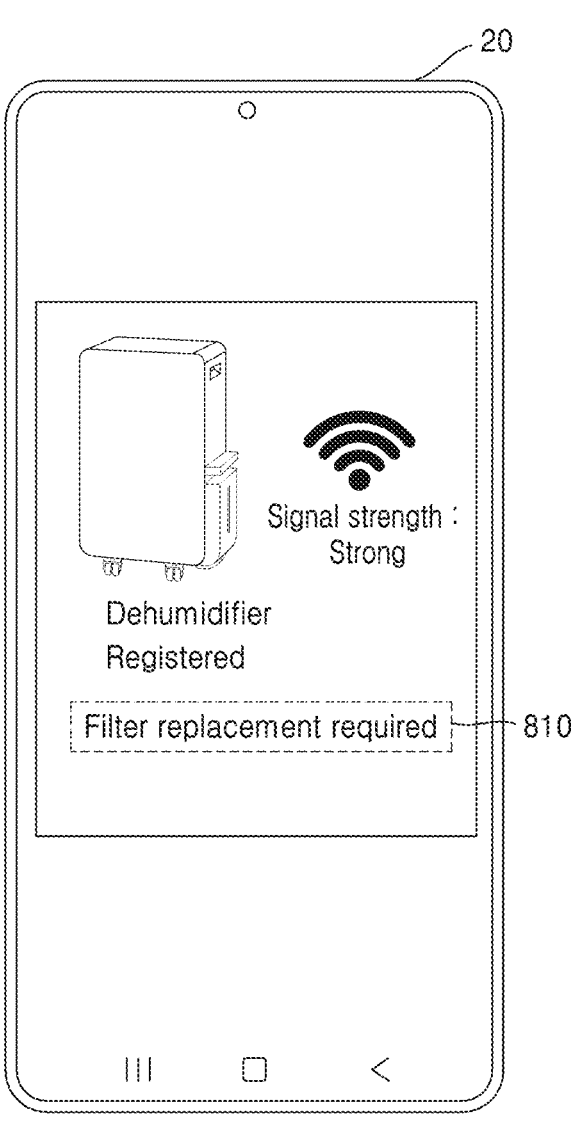
FIG. 8 is a diagram illustrating a user terminal receiving data from a mobile device and an electronic device located in an insufficient wireless coverage area inside a home and displaying the data on a screen, according to an embodiment of the disclosure.

FIG. 8 is a diagram illustrating a user terminal receiving data from a mobile device and an electronic device located in an insufficient wireless coverage area inside a home, and displaying the data on a screen, according to an embodiment of the disclosure.

Referring to FIG. 8, the user terminal 20 displays data transmitted from the mobile device 1000 having received the data from an electronic device in an insufficient wireless coverage area inside the home. For example, the user terminal 20 may display, on the screen, data 810 indicating "Filter replacement required", which is received from the dehumidifier 40 in the insufficient wireless coverage area inside the home. In an embodiment of the disclosure, it may be seen that, when BLE connection has been established between the dehumidifier 40 and the mobile device 1000, the user terminal 20 may also be wirelessly connected to the dehumidifier 40, and thus, the connection signal strength of the dehumidifier 40 is changed to "Strong".

Figure 9:
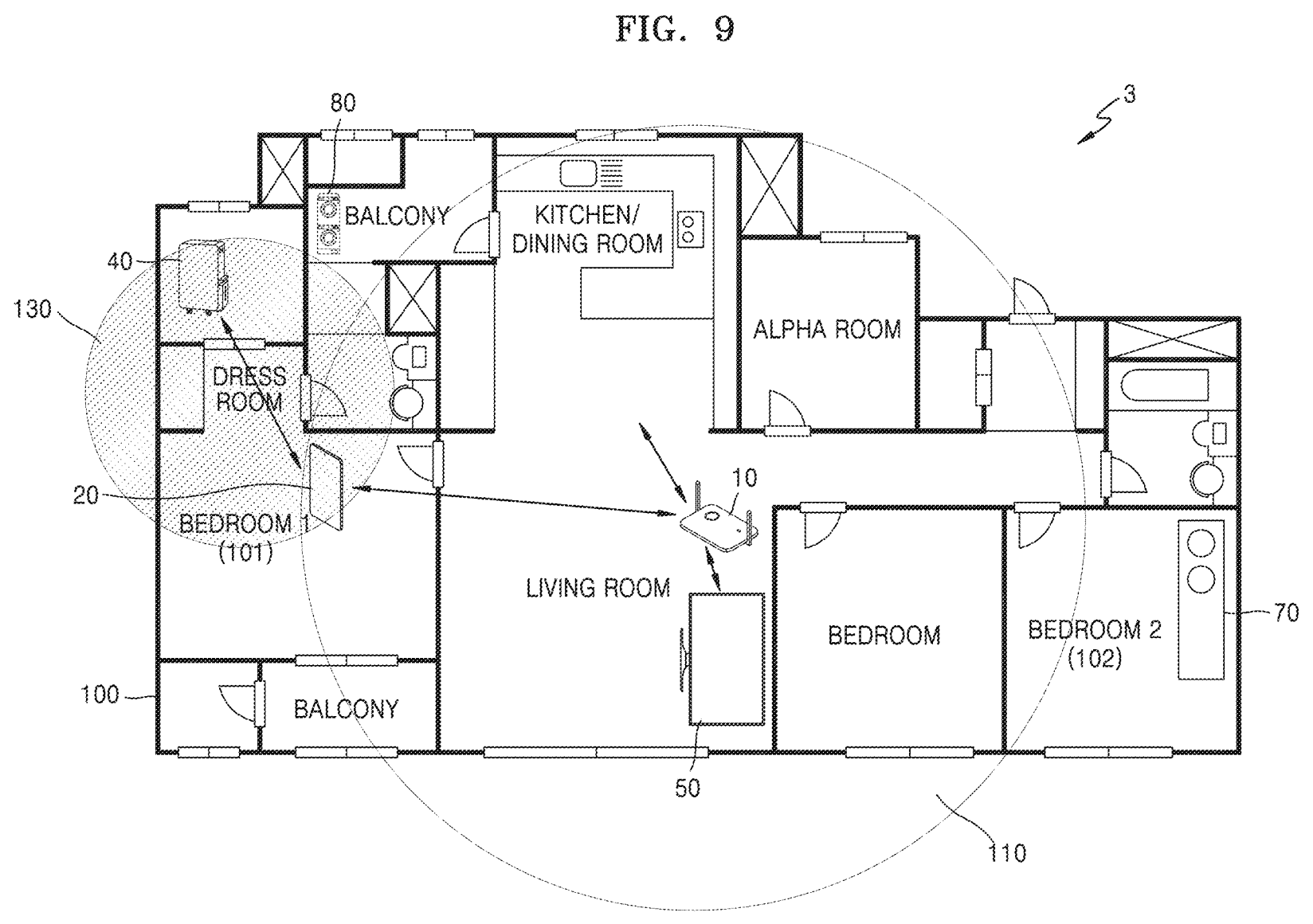

FIG. 9 is a diagram illustrating a user terminal performing wireless connection with an electronic device located in an insufficient wireless coverage area inside a home, according to an embodiment of the disclosure.

Referring to FIG. 9, the user terminal 20, rather than an electronic device that is able to move on its own, such as a robot cleaner, may serve as the mobile device 1000 in the home 3.

For example, in FIG. 3D, when the user 11 selects the hold-and-move button 213 for wireless connection with a device for which wireless connection is unavailable, the user 11 may hold the user terminal 20 and then move near the electronic device located in the insufficient wireless coverage area inside the home. At this time, the user terminal 20 may guide through the position of the electronic device located in the insufficient wireless coverage area inside the home.

In an embodiment of the disclosure, the user 11 may move to the bedroom 1 101 for connection with the dehumidifier 40 located in an insufficient wireless coverage area inside the home. The user terminal 20 having moved to the bedroom 1 101 may establish wireless connection with the dehumidifier 40 located in the insufficient wireless coverage area inside the home by using a BLE or WFD connection method. When the wireless connection with the dehumidifier 40 is established, the user terminal 20 may transmit and receive data to and from the dehumidifier 40.

Figure 17B:
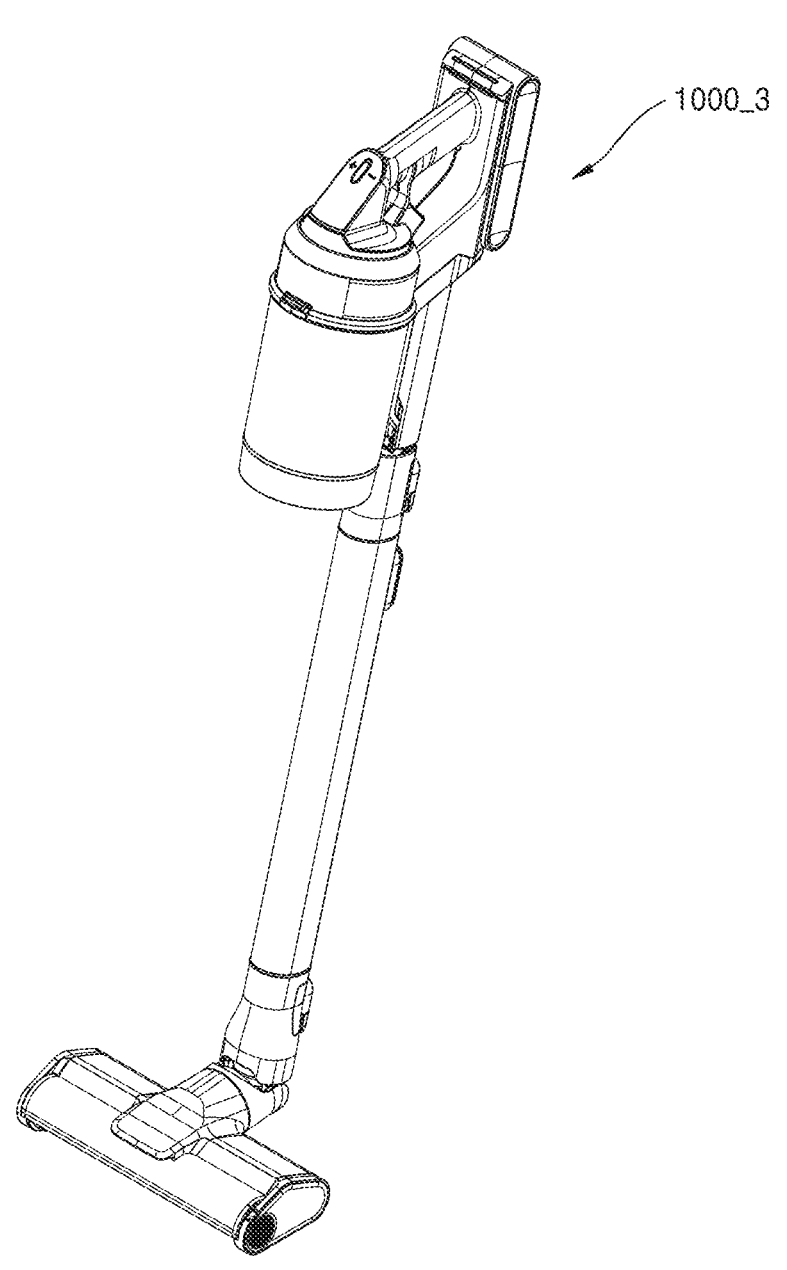
FIG. 17B illustrates a cordless cleaner as a mobile device according to an embodiment of the disclosure.

In FIG. 9, the user terminal 20 may be replaced with, for example, a cordless cleaner 1000_3 of FIG. 17B. In other words, when the user 11 enters the bedroom 1 101 to clean the bedroom 1 101 with the cordless cleaner 10003, the cordless cleaner 1000_3 serves as the mobile device 1000 to establish wireless connection with the dehumidifier 40 and transmit and receive necessary information.

Figure 10:
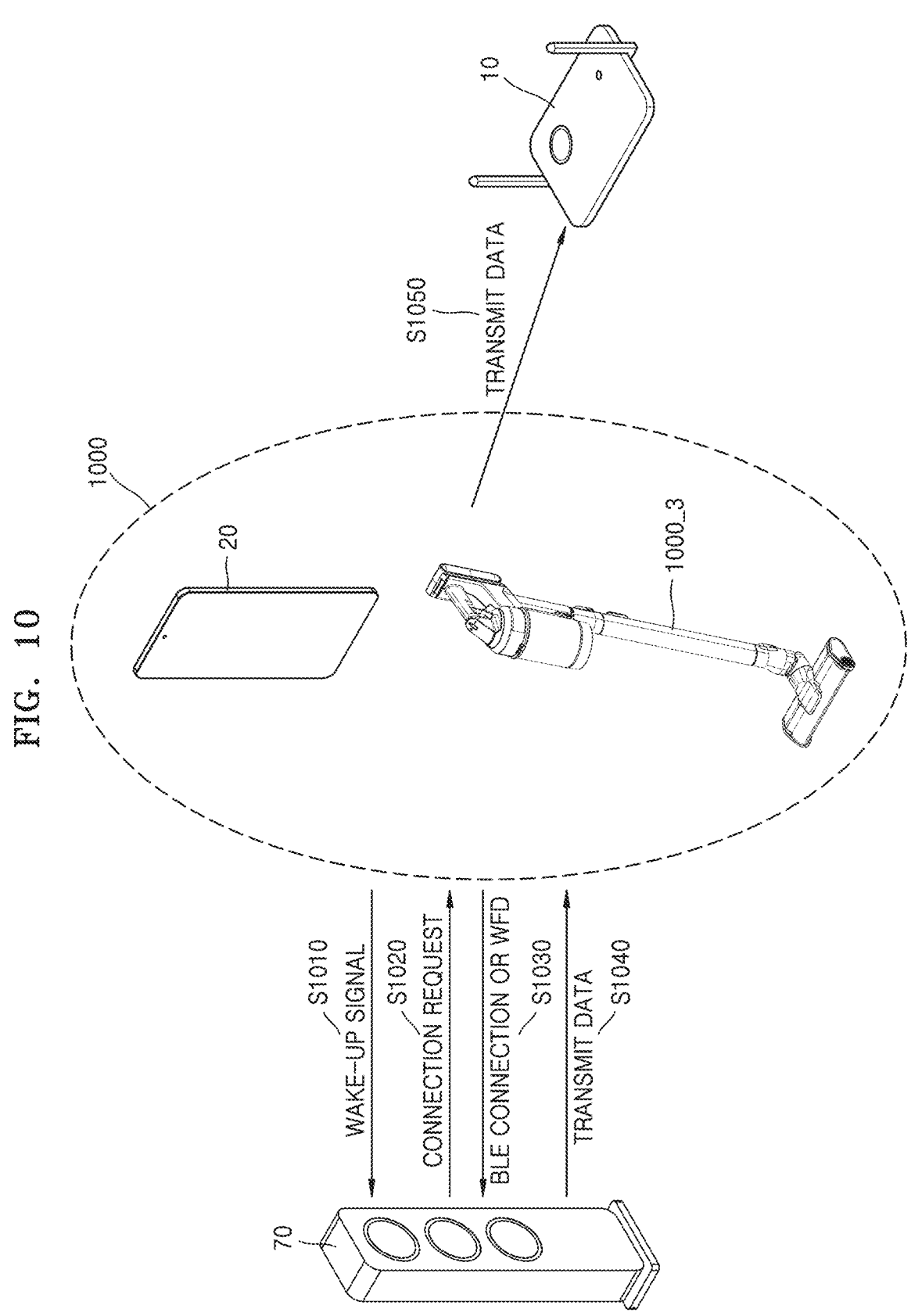
FIG. 10 is a diagram illustrating wireless connection established between an electronic device and a mobile device in an insufficient wireless coverage area inside a home, according to an embodiment of the disclosure.

FIG. 10 is a diagram illustrating wireless connection established between an electronic device and a mobile device in an insufficient wireless coverage area inside a home, according to an embodiment of the disclosure.

In FIG. 10, the mobile device 1000 that is wirelessly connected to an electronic device located in an insufficient wireless coverage area inside the home may be a user-carry mobile device such as the user terminal 20 or the cordless cleaner device 1000_3 to be carried by a user.

In FIG. 10, the air conditioner 70 is located in an insufficient wireless coverage area inside the home, where communication connection with the wireless router 10 is unavailable. In an embodiment of the disclosure, the user 11 holding the user terminal 20 or the cordless cleaner device 1000_3 may move to the insufficient wireless coverage area inside the home where the air conditioner 70 is located. For example, the user terminal 20 may display, on the screen thereof, identification information and position information about an electronic device located in the insufficient wireless coverage area inside the home.

In FIG. 7, the mobile device 1000 moves to the insufficient wireless coverage area inside the home by the movement command from the user terminal 20, whereas, in FIG. 10, the mobile device 1000 may move to the insufficient wireless coverage area inside the home periodically or once. For example, in a case in which a resident of the home 3 holds the cordless cleaner 1000_3 and cleans various parts of the home every day, when the cordless cleaner device 1000_3 reaches an insufficient wireless coverage area inside the home during cleaning, the cordless cleaner device 10003 may establish wireless connection with an electronic device for which wireless connection is unavailable, and transmit and receive necessary data. Likewise, the user terminal 20 may also require wireless connection with the air conditioner 70, and thus move to the air conditioner 70 located in the insufficient wireless coverage area inside the home, but while the user holding the user terminal 20 walks all around inside the home, the user terminal 20 may establish wireless connection with the air conditioner 70 located in the insufficient wireless coverage area inside the home, and transmit and receive necessary data. The cordless cleaner device 1000_3 will be described in more detail with reference to FIG. 17B.

FIG. 17B illustrates a cordless cleaner as a mobile device according to an embodiment of the disclosure.

The user 11 inside the home may move around inside the home for cleaning with the cordless cleaner device 1000_3 every day or once every few days. As such, the cordless cleaner device 1000_3 carried by the user 11 for cleaning may establish wireless connection with an electronic device located in an insufficient wireless coverage area inside the home, to receive data from the electronic device located in the insufficient wireless coverage area inside the home, or transmit a particular command to the electronic device located in the insufficient wireless coverage area inside the home. The particular command transmitted to the electronic device in the insufficient wireless coverage area inside the home may be a command that the cordless cleaner device 1000_3 has previously received from another device constituting the in-home network.

In an embodiment of the disclosure, the cordless cleaner device 1000_3 may include a battery for supplying power in a cordless mode, and a suction motor capable of sucking in dust.

Hereinafter, descriptions will be provided with reference to FIG. 10.

In an embodiment of the disclosure, in operation S1010, the mobile device 1000, which has moved within a predetermined distance from the air conditioner 70 for wireless connection, may transmit, to the air conditioner 70, a wake-up signal to wake up the air conditioner 70. It is optional for the mobile device 1000 to transmit the wake-up signal, and when the mobile device 1000 reaches the vicinity of the air conditioner 70 (e.g., within a predetermined distance from the air conditioner 70), which is an electronic device to be wirelessly connected, the mobile device 1000 may initiate wireless connection by receiving a connection request signal periodically broadcast by the air conditioner 70. In other words, a connection request signal broadcast by an electronic device located in the insufficient wireless coverage area inside the home, rather than a wake-up signal of the mobile device 1000, may be a wireless connection initiation signal.

In operation S1020, the air conditioner 70 may transmit a connection request signal to the mobile device 1000 in response to the wake-up signal of the mobile device 1000. In an embodiment of the disclosure, the connection request signal may be information indicating whether the air conditioner 70 may be connected through BLE or WFD. Alternatively, the connection request signal may not include information indicating whether a BLE connection or WFD connection is available. In the latter case, wireless connection may be established between the mobile device 1000 and the air conditioner 70 by using a pre-agreed communication method (e.g., BLE connection or WFD connection).

In operation S1030, the mobile device 1000 may establish wireless connection with the air conditioner 70 in response to the connection request signal or based on the connection request signal. When the connection request signal does not include information about a particular wireless connection method, the mobile device 1000 and the air conditioner 70 may establish wireless connection by using a pre-agreed communication method. In an embodiment of the disclosure, when the connection request signal does not include information about a particular wireless connection method, the mobile device 1000 may attempt a BLE connection with the air conditioner 70. When the BLE connection with the air conditioner 70 fails, the mobile device 1000 may attempt a WFD connection. Alternatively, in the opposite order, the mobile device 1000 may first attempt the WFD connection with the air conditioner 70. When the mobile device 1000 fails to establish the WFD connection with the air conditioner 70, the mobile device 1000 may attempt the BLE connection with the air conditioner 70 as an alternative.

When the connection request signal transmitted or broadcast by the air conditioner 70 includes information about a particular wireless connection method, the mobile device 1000 may perform wireless connection with the air conditioner 70 by using the wireless connection method included in the connection request signal. In an embodiment of the disclosure, when the connection request signal includes information that a BLE connection is available, the mobile device 1000 may perform the BLE connection with the air conditioner 70. In an embodiment of the disclosure, when the connection request signal includes information that a WFD connection is available, the mobile device 1000 may perform the WFD connection with the air conditioner 70. In an embodiment of the disclosure, when the connection request signal includes information that both a BLE connection and WFD connection are available, the mobile device 1000 may perform any one of the BLE connection or the WFD connection with the air conditioner 70. In an embodiment of the disclosure, when the connection request signal includes information that both the BLE connection and the WFD connection are available, the mobile device 1000 may first attempt the BLE connection with the air conditioner 70, and when the BLE connection is not established, perform the WFD connection.

In operation S1040, the air conditioner 70 may transmit or receive data to or from the mobile device 1000 based on the established wireless connection.

In operation S1050, the mobile device 1000 may transmit, to the wireless router 10, the data received from the air conditioner 70 such that other electronic devices may receive the data through the in-home network. Alternatively, the mobile device 1000 may store the data received from the air conditioner 70 and then transmit the data received from the air conditioner 70 along with the identification information of the air conditioner 70 to an electronic device inside the home, which requests the data. In operation S1050, it is optional for the mobile device 1000 to transmit the data received from the air conditioner 70 such that other electronic devices may receive the data through the in-home network. In other words, in operation S1040, for example, when the user terminal 20 serving as the mobile device 1000 transmits and receives data to and from the air conditioner 70, a wireless connection process with an electronic device in the insufficient wireless coverage area inside the home may be terminated by the mobile device 1000.

Figure 11A:
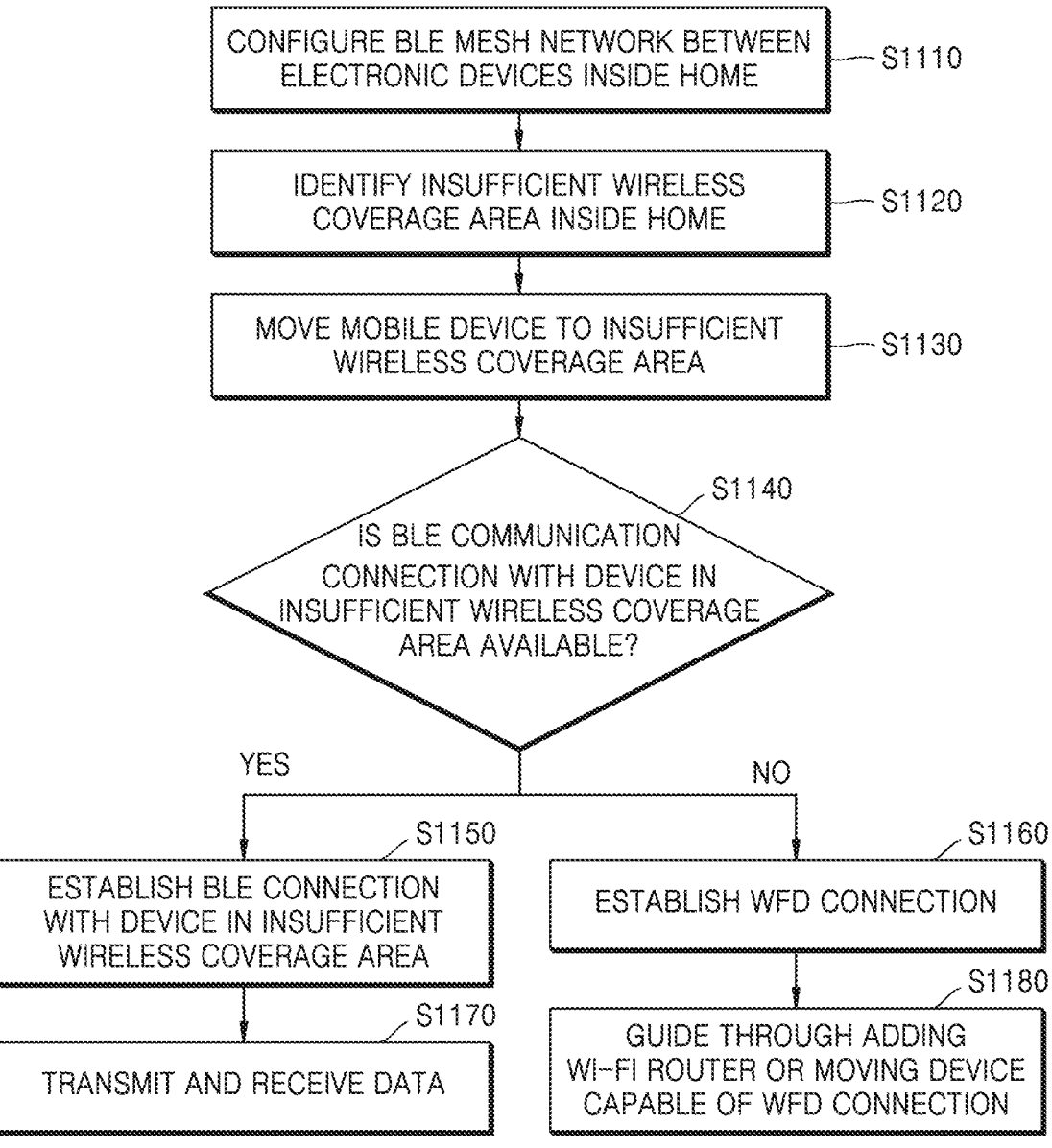
FIG. 11A is a flowchart of a method of performing wireless connection with an electronic device in an insufficient wireless coverage area inside a home, according to an embodiment of the disclosure.

FIG. 11A is a flowchart of a method of performing wireless connection with an electronic device in an insufficient wireless coverage area inside a home, according to an embodiment of the disclosure.

In operation S1110, according to an embodiment of the disclosure, an in-home network may be configured as a BLE mesh network between electronic devices inside the home. This is only an example, and the electronic devices inside the home may constitute an in-home wireless network in different manners. For example, the in-home wireless network may be configured with UWB, Zigbee, HomeRF, IrDA, wireless LAN, Z-Wave, or the like, in addition to the BLE mesh network.

In operation S1120, an insufficient wireless coverage area inside the home may be identified. For example, the insufficient wireless coverage area inside the home may be identified by the user terminal 20 receiving, from the wireless router 10, information in which the insufficient wireless coverage area inside the home is identified. In an embodiment of the disclosure, the information in which the insufficient wireless coverage area inside the home is identified may also include identification information of an electronic device located in the insufficient wireless coverage area inside the home. In an embodiment of the disclosure, the information in which the insufficient wireless coverage area inside the home is identified may also include position information of the electronic device located in the insufficient wireless coverage area inside the home. A movement command may be transmitted to the mobile device 1000 for transmission and reception of data with the electronic device located in the insufficient wireless coverage area inside the home. In an embodiment of the disclosure, the movement command may be transmitted from the user terminal 20 to the mobile device 1000. In an embodiment of the disclosure, in order to collect data or transmit a particular command from or to electronic devices located in the insufficient wireless coverage area inside the home, the wireless router 10 may periodically transmit a movement command to the mobile device 1000 located in an area inside the home where wireless connection is available, based on presetting by the user or event triggering. In an embodiment of the disclosure, when the user 11 outside the home issues a command to the wireless router 10 to turn off the air conditioner 70 through a wireless network by using the user terminal 20, but the air conditioner 70 is located in an insufficient wireless coverage area inside the home, the wireless router 10 may regard, as event triggering, the command to turn off the air conditioner 70, and thus transmit a movement command to the mobile device 1000. In an embodiment of the disclosure, event triggering based on a particular time may occur. When the user 11, before going on a long journey, sets a light in the bedroom 2 102 to turn on at 8 PM every day, but a light device in the bedroom 2 102 is located in an insufficient wireless coverage area inside the home, '8 PM every day' may be event triggering to turn on the light device in the bedroom 2 102. The wireless router 10 may transmit a movement command to the mobile device 1000 at 8 PM every day so as to transmit, to the light device, an operation command to turn on the light device. Further, the travel time of the mobile device 1000 to reach a location near the insufficient wireless coverage area inside the home can be determined, and the wireless router 10 may transmit the movement command to the mobile device 1000 prior to a desired event time to account for the travel time of the mobile device 1000. For instance, if it is determined that the travel time of the mobile device 1000 is about 3 minutes based on previous travels, the wireless router 10 may transmit a movement command to the mobile device 1000 at 7:57 PM to meet the targeted event time of 8 PM.

In operation S1130, the mobile device 1000 may move to the insufficient wireless coverage area inside the home, based on the movement command. When the mobile device 1000 is unable to move by the movement command transmitted from the user terminal 20 or the wireless router 10 (e.g., when the mobile device 1000 momentarily moves to an insufficient wireless coverage area inside the home, when the battery is being charged, or when an abnormality occurs in a driving device), a movement command may be transmitted to a second mobile device located in an area inside the home where wireless connection is available. For example, when a movement command is transmitted from the user terminal 20 to the mobile device 1000, but the mobile device 1000 is unavailable, a move command may be transmitted to the second mobile device by the user terminal 20 or automatically, based on the mobile device 1000 not responding to the movement command or a response indicating the inability to move according to the movement command. In an embodiment of the disclosure, when the mobile device 1000 is in an area inside the home where wireless connection is available and thus receives the movement command, but is unable to move, the mobile device 1000 may forward the movement command to the second mobile device. Based on the forwarded movement command, the second mobile device may move near the electronic device located in the insufficient wireless coverage area inside the home.

In operation S1140, the mobile device 1000, which has moved to the insufficient wireless coverage area inside the home, may attempt to establish wireless connection with the electronic device located in the insufficient wireless coverage area inside the home. At this time, according to an embodiment of the disclosure, the mobile device 1000 may inquire whether a BLE connection with the electronic device located in the insufficient wireless coverage area inside the home is available. When the mobile device 1000 reaches the vicinity of the electronic device located in the insufficient wireless coverage area inside the home (e.g., within a predetermined distance) and then transmits a wake-up signal, the inquiry as to whether the BLE connection is available may be included in the wake-up signal. In an embodiment of the disclosure, the wake-up signal may not include the inquiry as to whether the BLE connection is available, and the mobile device 1000 may not transmit the wake-up signal itself. In a case in which the wake-up signal is not transmitted, for example, the electronic device located in the insufficient wireless coverage area inside the home may broadcast a connection request signal. The mobile device 1000 may determine whether the BLE connection with the electronic device located in the insufficient wireless coverage area inside the home is available, based on information included in the broadcast connection request signal.

When, in operation S1140, the electronic device located in the insufficient wireless coverage area inside the home is capable of a BLE connection (or BLE mesh network wireless connection), in operation S1150, the mobile device 1000 incorporates the electronic device located in the insufficient wireless coverage area inside the home, into a BLE mesh network through wireless connection. The electronic device enabled for wireless connection in operation S1170 may transmit, through the BLE mesh network, data to the mobile device 1000 and/or another device in the BLE mesh network.

When, in operation S1140, the electronic device located in the insufficient wireless coverage area inside the home is not capable of a BLE connection, in operation S1160, the mobile device 1000 may attempt a WFD connection.

In operation S1180, when the mobile device 1000 establishes wireless connection with the electronic device located in the insufficient wireless coverage area inside the home, the user terminal 20 may take measures to ensure that the electronic device located in the insufficient wireless coverage area inside the home is no longer in the insufficient wireless coverage area. In an embodiment of the disclosure, the user terminal 20 may guide through installing or moving an additional Wi-Fi router or a device capable of a WFD connection, based on information about a position where the mobile device 1000 has moved and established wireless connection with the electronic device located in the insufficient wireless coverage area inside the home.

Figure 11B:
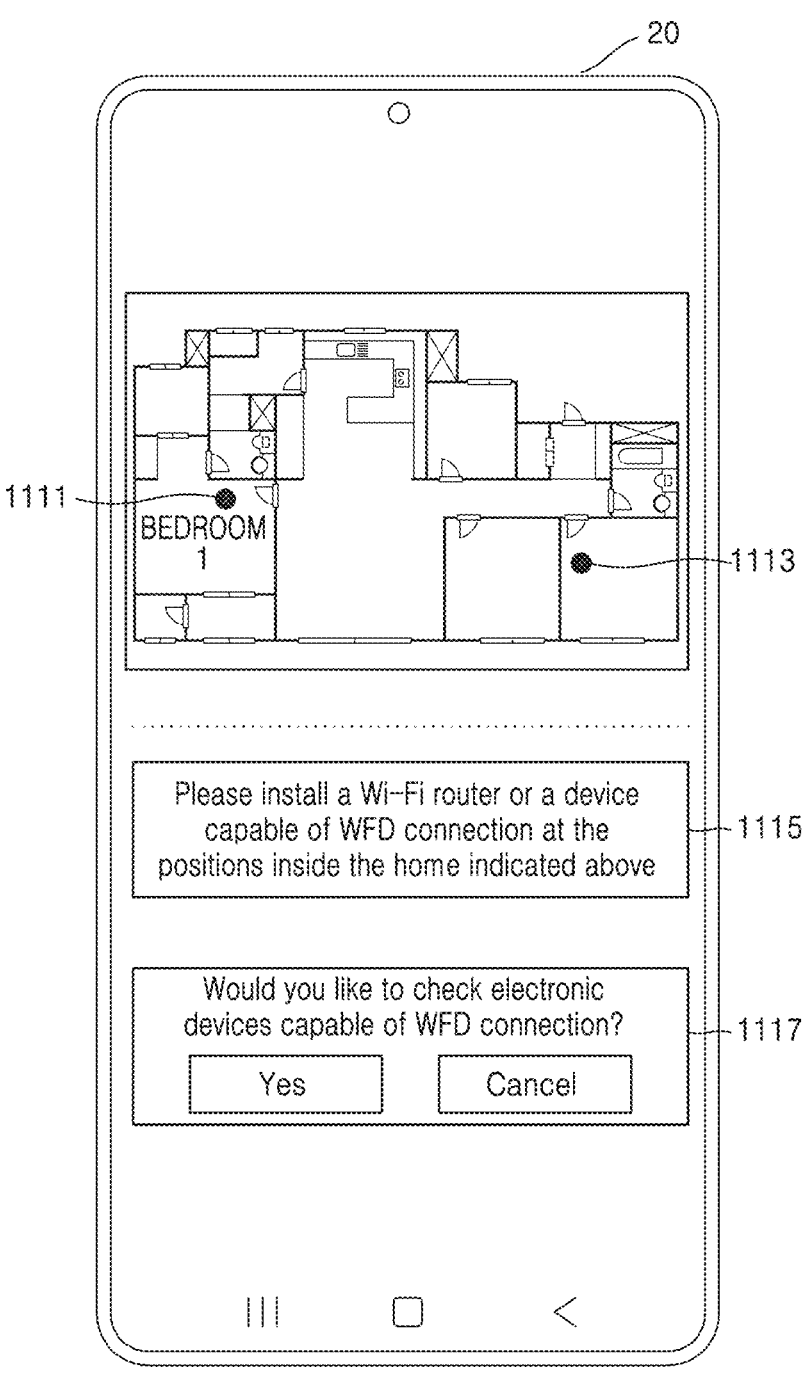
FIG. 11B illustrates a screen for guiding through installing or moving an additional Wi-Fi router or a device capable of Wi-Fi Direct (WFD) connection, when a user terminal has established wireless connection with an electronic device located in an insufficient wireless coverage area inside a home, according to an embodiment of the disclosure.

FIG. 11B illustrates a screen for guiding through installing or moving an additional Wi-Fi router or a device capable of a WFD connection, when a user terminal has established wireless connection with an electronic device located in an insufficient wireless coverage area inside a home, according to an embodiment of the disclosure.

Referring to FIG. 11B, after performing wireless connection with an electronic device located in an insufficient wireless coverage area inside the home, the user terminal 20 may take necessary measures to minimize the insufficient wireless coverage area inside the home. For example, the user terminal 20 may display a guide screen 1115 for guiding through installing or moving an additional Wi-Fi router or a device capable of a WFD connection near an electronic device located in the insufficient wireless coverage area inside the home on a home map (points 1111 and 1113 in FIG. 11B).

In an embodiment of the disclosure, when determining a position where an additional Wi-Fi router or device capable of a WFD connection is to be installed or moved to, the user terminal 20 may use position information or map information received from the mobile device 1000 that has established wireless connection with the electronic device located in the insufficient wireless coverage area inside the home. In an embodiment of the disclosure, the user terminal 20 may determine the position where an additional Wi-Fi router or a device capable of a WFD connection is to be installed or moved to, by combining pre-stored home map information and a previously registered position of an unconnectable electronic device among pre-stored registered electronic devices.

Referring to FIG. 11B, the user terminal 20 may display a guide screen 1117 for guiding through electronic devices capable of a WFD connection (e.g., a peer-to-peer (P2P) connection) among electronic devices constituting the in-home network. In an embodiment of the disclosure, when the user 11 touches 'Yes' on the guide screen 1117, the user terminal 20 may display a list of electronic devices capable of a WFD connection (e.g., a P2P connection) among the electronic devices constituting the in-home network.

Based on such a guide, for example, when the station of the robot cleaner 60 of FIG. 1A is included in the list of devices capable of a WFD connection, the user 11 may move the station of the robot cleaner 60 to any one of the points 1111 and 1113 on the home map. By taking these measures, the insufficient wireless coverage area inside the home may be minimized.

Figure 12:
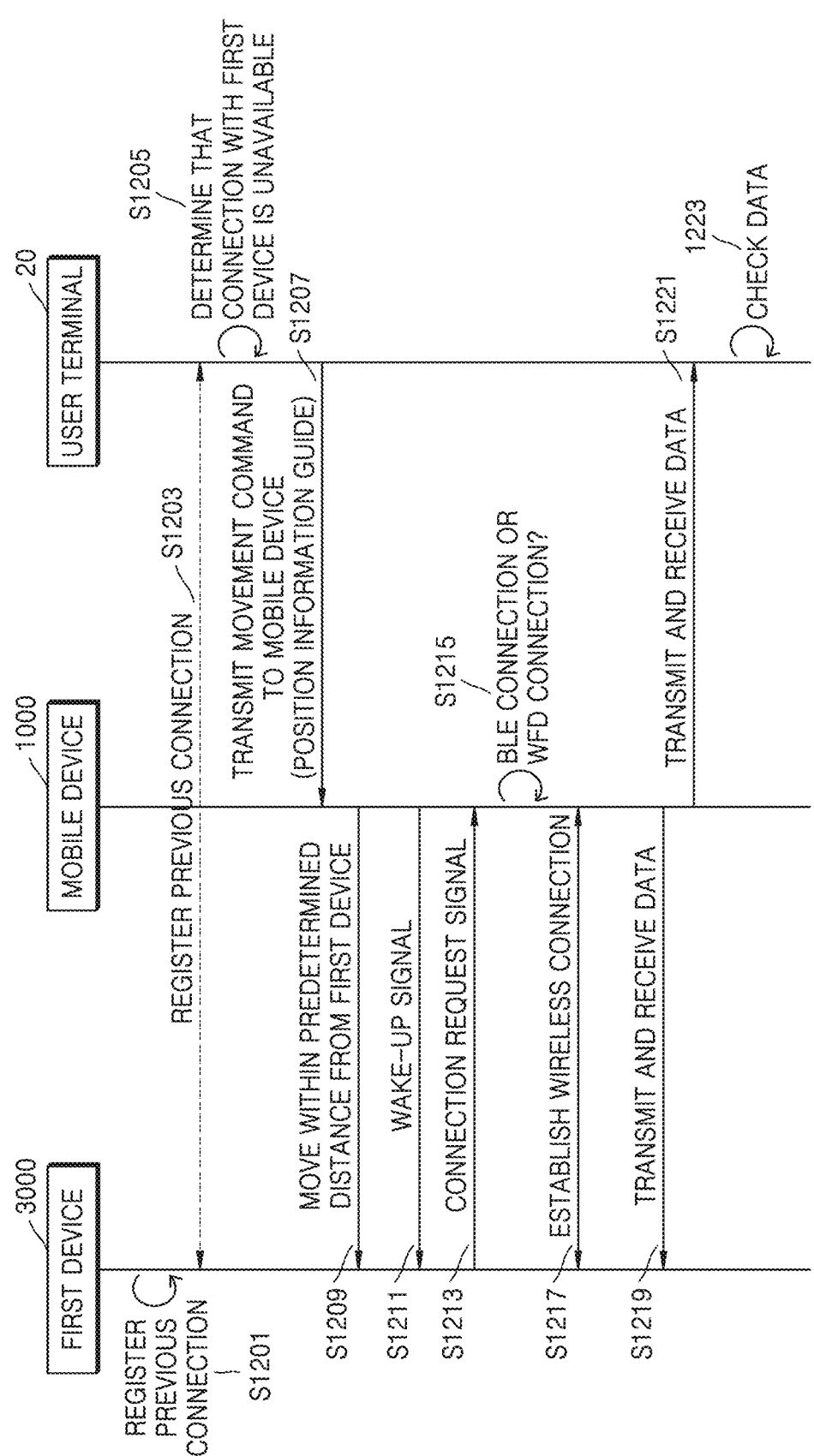
FIG. 12 is a sequence diagram illustrating wireless connection established between an electronic device and a mobile device in an insufficient wireless coverage area inside a home, according to an embodiment of the disclosure.

FIG. 12 is a sequence diagram illustrating wireless connection established between an electronic device and a mobile device in an insufficient wireless coverage area inside a home, according to an embodiment of the disclosure.

Referring to FIG. 12, the electronic device located in the insufficient wireless coverage area inside the home is a first device 3000.

In operation S1201, the first device 3000 is a device that has already been registered on an in-home network at some point before a wireless connection with the mobile device 1000 is established. Although operation S1201 is illustrated as if the registration has been performed in the first device 3000, it is illustrated that the registration is actually performed in a device not illustrated in FIG. 12. In operation S1201, the first device 3000 may be registered in the wireless router 10 or the user terminal 20 as in operation S1203. The user terminal 20 may receive information about electronic devices inside the home that are already registered in an external server (not shown), from the wireless router 10 or through the wireless router 10 via the in-home network.

In operation S1205, the user terminal 20 determines that wireless connection between the first device 3000 and the wireless router 10 is unavailable because the first device 3000 is in an insufficient wireless coverage area inside the home. Alternatively, in an embodiment of the disclosure, when the in-home wireless network is a BLE connection (or BLE mesh network wireless connection), the user terminal 20 may determine that wireless connection is unavailable because the first device 3000 is in the insufficient wireless coverage area inside the home.

In operation S1207, based on determining that a wireless connection is unavailable due to the first device 3000 being in the insufficient wireless coverage area inside the home, the user terminal 20 may transmit a movement command to the mobile device 1000 to move to a position where the first device 3000 is located. In an embodiment of the disclosure, the movement command in operation S1207 may correspond to the 'wireless connection command' described above with reference to FIGS. 3B, 3D, 4, and 5 of the disclosure. In an embodiment of the disclosure, the movement command may optionally include information about the position inside the home where the first device 3000 is located.

In operation S1209, the mobile device 1000, which has received the movement command from the user terminal 20, moves near the first device 3000 (e.g., within a predetermined distance where a wireless connection with the first device 3000 is available) based on the movement command. In an embodiment of the disclosure, the position to which the mobile device 1000 has moved to establish a wireless connection with the first device 3000 may be where wireless communication with the wireless router 10 and/or the user terminal 20 is still available. Alternatively, the position to which the mobile device 1000 has moved may be near another electronic device that is connected to the in-home network, thus is capable of wireless connection, and is closest to the first device 3000.

In operation S1211, according to an embodiment of the disclosure, the mobile device 1000 may transmit a wake-up signal to the first device 3000 to wake up the first device 3000, at the position to which the mobile device 1000 has moved for wireless connection with the first device 3000.

In operation 51213, the first device 3000 may wake up based on the wake-up signal transmitted by the mobile device 1000, and transmit a connection request signal to the mobile device 1000 in response to the wake-up signal. In an embodiment of the disclosure, in a case in which the first device 3000 broadcasts a connection request signal, operation S1211 may be omitted. Thus, in an embodiment of the disclosure, the first device 3000 may broadcast a connection request signal regardless of the wake-up signal.

In operation S1215, the mobile device 1000 may determine whether to perform a BLE connection or a WFD connection, based on the connection request signal received from the first device 3000. In a case in which it has been previously determined which wireless connection is to be established between the mobile device 1000 and the first device 3000, operation S1215 is optional and thus may be omitted. When determining whether to perform a BLE connection or a WFD connection with the first device 3000, the mobile device 1000 may use the connection request signal received from the first device 3000. In other words, according to an embodiment of the disclosure, the connection request signal may include information about which wireless connection type the first device 3000 is capable of.

In an embodiment of the disclosure, the connection request signal may not include information about which wireless connection type the first device 3000 is capable of, and the type of wireless connection to be established between the first device 3000 and the mobile device 1000 may not be determined in advance. In this case, the mobile device 1000 may attempt a BLE connection and/or a WFD connection with the first device 3000. In an embodiment of the disclosure, the mobile device 1000 may sequentially attempt a BLE connection and a WFD connection with the first device 3000.

In operation S1217, a wireless connection may be established between the mobile device 1000 and the first device 3000 through any one of a BLE connection or a WFD connection.

In operation S1219, the first device 3000 may transmit data related to the first device 3000 to the mobile device 1000 through the established wireless connection. Alternatively, in an embodiment of the disclosure, the first device 3000 may receive necessary data (e.g., an operation command related to the first device 3000) from the mobile device 1000.

In operation S1221, the mobile device 1000 may forward, to the user terminal 20, the data related to the first device 3000 received from the first device 3000, and in operation S1223, the user terminal 20 may check the received data related to the first device 3000 and take follow-up measures.

Each of the above-described operations of FIG. 12 is not necessarily essential, and some operations may be omitted according to an embodiment of the disclosure.

Figure 13:
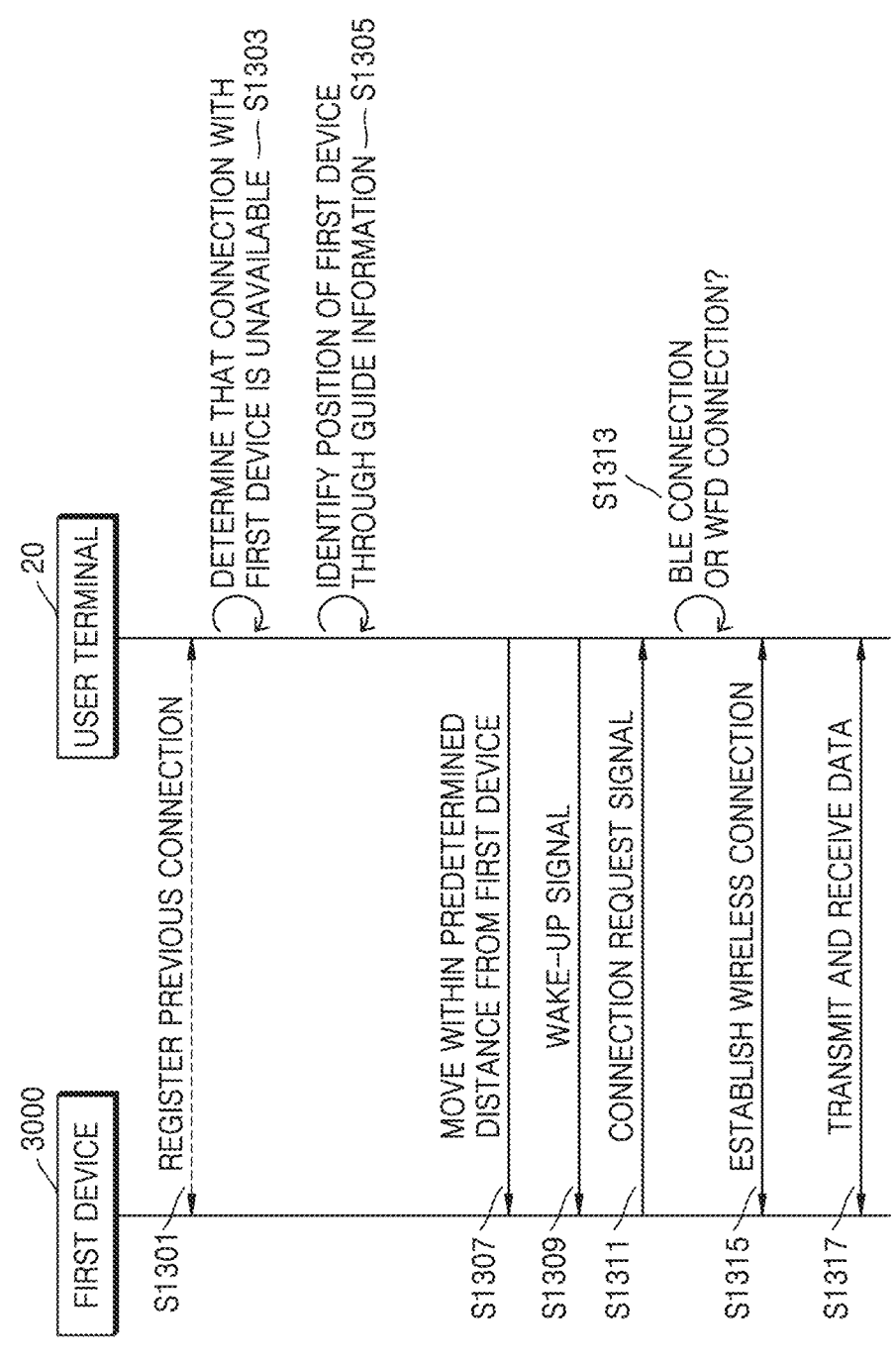
FIG. 13 is a sequence diagram illustrating wireless connection established between an electronic device and a mobile device in an insufficient wireless coverage area inside a home, according to an embodiment of the disclosure.

FIG. 13 is a sequence diagram illustrating wireless connection established between an electronic device and a mobile device in an insufficient wireless coverage area inside a home, according to an embodiment of the disclosure.

Unlike FIG. 12, the mobile device of FIG. 13 is a device that may be carried and moved by the user 11, such as the user terminal 20 or the cordless cleaner 1000_3. Thus, in FIG. 13, the user terminal 20 may be any electronic device that may be carried by a user (e.g., the cordless cleaner device 10003, a mobile phone, or a tablet computer).

Referring to FIG. 13, an electronic device located in an insufficient wireless coverage area inside a home is the first device 3000.

In operation S1301, the first device 3000 is a device that has already been registered with the user terminal 20 or the wireless router 10 on an in-home network at some point before wireless connection with the user terminal 20 is attempted. The first device 3000 may be registered in the wireless router 10 or the user terminal 20. Alternatively, the user terminal 20 may receive information about electronic devices inside the home that are already registered in an external server (not shown), from the wireless router 10 or through the wireless router 10 via the in-home network.

In operation S1303, the user terminal 20 may determine that wireless connection between the first device 3000 and the wireless router 10 is unavailable because the first device 3000 is in an insufficient wireless coverage area inside the home. Alternatively, in an embodiment of the disclosure, when the in-home wireless network is a BLE connection (or BLE mesh network wireless connection), the user terminal 20 may determine that wireless connection is unavailable because the first device 3000 is in the insufficient wireless coverage area inside the home.

In operation S1305, according to an embodiment of the disclosure, the user terminal 20 may check guide information about the position of the first device 3000 located in an insufficient wireless coverage area inside the home. For example, the user terminal 20 may identify the position of the first device 3000 through position information identified when the first device 3000 is pre-registered. In an embodiment of the disclosure, operation S1305 is not an essential operation and may optionally be omitted.

In operation S1307, the user terminal 20 moves near the first device 3000 (e.g., within a predetermined distance where wireless connection with the first device 3000 is available). In an embodiment of the disclosure, the user terminal 20 may move near the first device 3000 to establish a wireless connection with the first device 3000, based on guide information including position information. In an embodiment of the disclosure, the position to which the user terminal 20 has moved may be where wireless communication with the wireless router 10 is still available. Alternatively, the position to which the user terminal 20 has moved may be near another electronic device that is connected to the in-home network, thus is capable of wireless connection, and is closest to the first device 3000.

In operation S1309, according to an embodiment of the disclosure, the user terminal 20 may transmit a wake-up signal to the first device 3000 to wake up the first device 3000, at the position to which the user terminal 20 has moved for wireless connection with the first device 3000.

In operation S1311, the first device 3000 may wake up based on the wake-up signal transmitted by the user terminal 20, and transmit a connection request signal to the user terminal 20 in response to the wake-up signal. In an embodiment of the disclosure, in a case in which the first device 3000 broadcasts a connection request signal, operation S1309 is optional and may be omitted. Thus, in an embodiment of the disclosure, the first device 3000 may broadcast a connection request signal regardless of the wake-up signal.

In operation S1313, the user terminal 20 may determine whether to perform a BLE connection or a WFD connection, based on the connection request signal received from the first device 3000. In an embodiment of the disclosure, in a case in which it has been previously determined which wireless connection is to be established between the user terminal 20 and the first device 3000, operation S1313 is optional and may be omitted. When determining whether to perform a BLE connection or a WFD connection with the first device 3000, the user terminal 20 may use the connection request signal received from the first device 3000. In other words, according to an embodiment of the disclosure, the connection request signal may include information about which wireless connection type the first device 3000 is capable of.

In an embodiment of the disclosure, the connection request signal may not include information about which wireless connection type the first device 3000 is capable of, and the type of wireless connection to be established between the first device 3000 and the user terminal 20 may not be determined in advance. In this case, the user terminal 20 may attempt a BLE connection and/or a WFD connection with the first device 3000. In an embodiment of the disclosure, the user terminal 20 may sequentially attempt a BLE connection and a WFD connection with the first device 3000.

In operation S1313, a wireless connection may be established between the user terminal 20 and the first device 3000 through any one of a BLE connection or a WFD connection.

In operation S1317, the first device 3000 may transmit data related to the first device 3000 to the user terminal 20 through the established wireless connection. Alternatively, in an embodiment of the disclosure, the first device 3000 may receive necessary data (e.g., an operation command related to the first device 3000) from the user terminal 20. When the user terminal 20 receives data from the first device 3000, the user terminal 20 may display, on the screen thereof, the data such that the user 11 may check the data.

Each of the above-described operations of FIG. 13 is not necessarily essential, and some operations may be omitted according to an embodiment of the disclosure.

Figure 14:
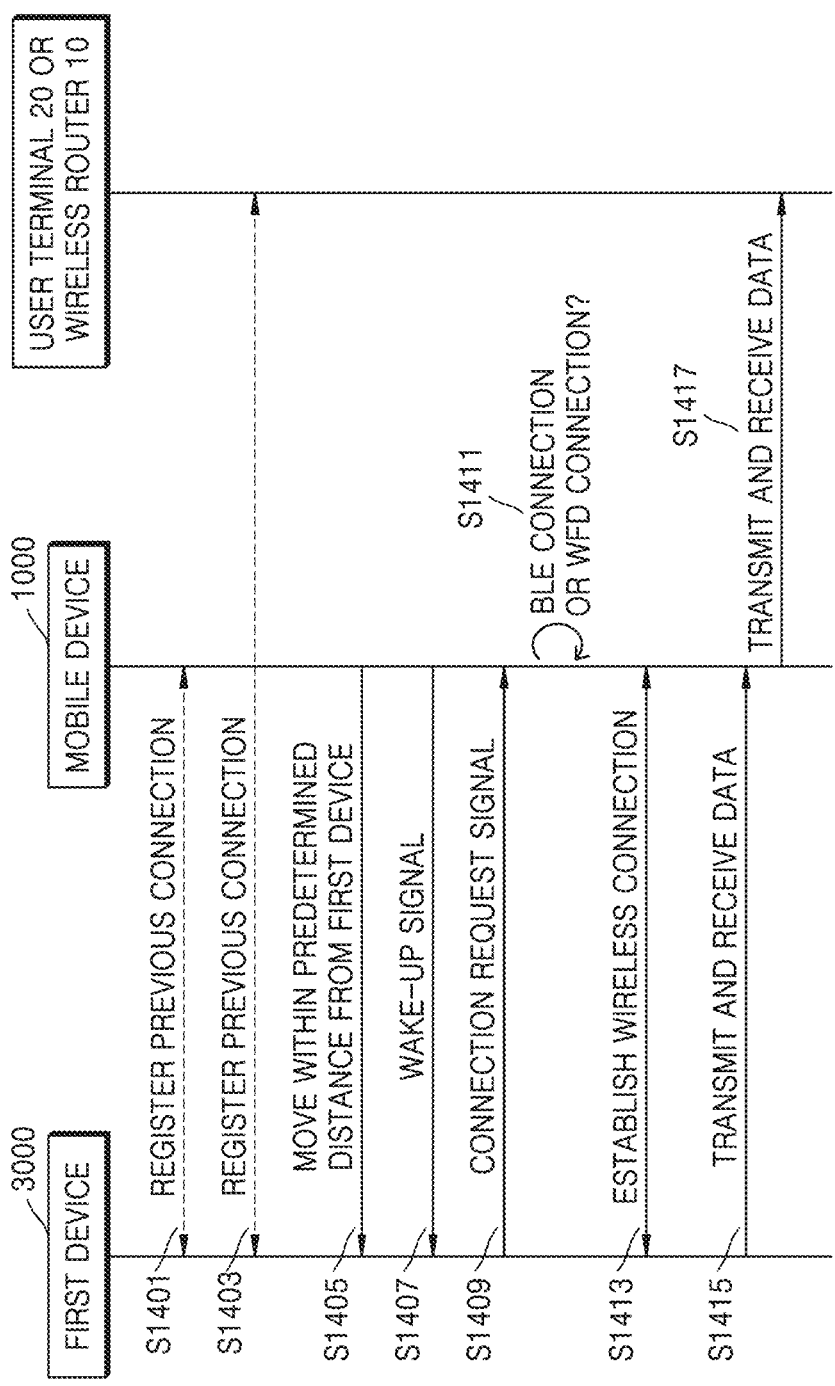
FIG. 14 is a sequence diagram illustrating wireless connection established between an electronic device and a mobile device in an insufficient wireless coverage area inside a home, according to an embodiment of the disclosure.

FIG. 14 is a sequence diagram illustrating wireless connection established between an electronic device and a mobile device in an insufficient wireless coverage area inside a home, according to an embodiment of the disclosure.

Referring to FIG. 14, the electronic device located in the insufficient wireless coverage area inside the home is the first device 3000.

In operation S1401, the first device 3000 is a device that has already been registered on an in-home network at some point before wireless connection with the mobile device 1000 is established. The first device 3000 may be registered in the wireless router 10, or in the user terminal 20 or the wireless router 10 as in operation S1403. Alternatively, in an embodiment of the disclosure, the mobile device 1000 may receive information about electronic devices inside the home that are already registered in an external server (not shown), from the wireless router 10 or through the wireless router 10 via the in-home network.

In operation S1405, the mobile device 1000 moves near the first device 3000 (e.g., within a predetermined distance where wireless connection with the first device 3000 is available). At this time, the mobile device 1000 has not received, from a certain device in the in-home network, a movement command to move to the first device 3000, but due to the characteristics of the mobile device 1000, may attempt to establish a wireless connection with the first device 3000 by moving around inside the home periodically or according to particular event triggering. For example, the user 11 may move the cordless cleaner 1000_3 serving as the mobile device 1000, near the first device 3000 for ordinary cleaning. Alternatively, in an embodiment of the disclosure, in a case in which the mobile device 1000 is the serving robot 10002, the serving robot 1000_2 may move within a predetermined distance from the first device 3000 while moving for serving. At this time, the position to which the cordless cleaner 1000_3 or the serving robot 1000_2 has moved to establish wireless connection with the first device

3000 may be where wireless communication with the wireless router 10 and/or the user terminal 20 is still available.

In operation S1407, according to an embodiment of the disclosure, the mobile device 1000 may transmit a wake-up signal to the first device 3000 to wake up the first device 3000, at the position to which the mobile device 1000 has moved for wireless connection with the first device 3000.

In operation S1409, the first device 3000 may wake up based on the wake-up signal transmitted by the mobile device 1000, and transmit a connection request signal to the mobile device 1000 in response to the wake-up signal. In an embodiment of the disclosure, in a case in which the first device 3000 broadcasts a connection request signal, operation S1407 is optional and may be omitted. Thus, in an embodiment of the disclosure, the first device 3000 may broadcast a connection request signal regardless of the wake-up signal.

In operation S1411, the mobile device 1000 may determine whether to perform a BLE connection or WFD connection, based on the connection request signal received from the first device 3000. In a case in which it has been previously determined which type of wireless connection is to be established between the mobile device 1000 and the first device 3000, operation S1411 is optional and may be omitted. When determining whether to perform a BLE connection or a WFD connection with the first device 3000, the mobile device 1000 may use the connection request signal received from the first device 3000. In other words, according to an embodiment of the disclosure, the connection request signal may include information about which type of wireless connection the first device 3000 is capable of.

In an embodiment of the disclosure, the connection request signal may not include information about which type of wireless connection the first device 3000 is capable of, and the type of wireless connection to be established between the first device 3000 and the mobile device 1000 may not be determined in advance. In this case, the mobile device 1000 may attempt a BLE connection and/or a WFD connection with the first device 3000. In an embodiment of the disclosure, the mobile device 1000 may sequentially attempt a BLE connection and a WFD connection with the first device 3000.

In operation S1413, a wireless connection may be established between the mobile device 1000 and the first device 3000 through any one of a BLE connection or a WFD connection.

In operation S1415, the first device 3000 may transmit data related to the first device 3000 to the mobile device 1000 through the established wireless connection. Alternatively, in an embodiment of the disclosure, the first device 3000 may receive necessary data (e.g., an operation command related to the first device 3000) from the mobile device 1000.

In operation S1417, the mobile device 1000 may forward, to the wireless router 10 or the user terminal 20, the data related to the first device 3000 received from the first device 3000, and the user terminal 20 may check the received data related to the first device 3000 and take follow-up measures.

Each of the above-described operations of FIG. 14 is not necessarily essential, and some operations may be omitted according to an embodiment of the disclosure.

Figure 15:
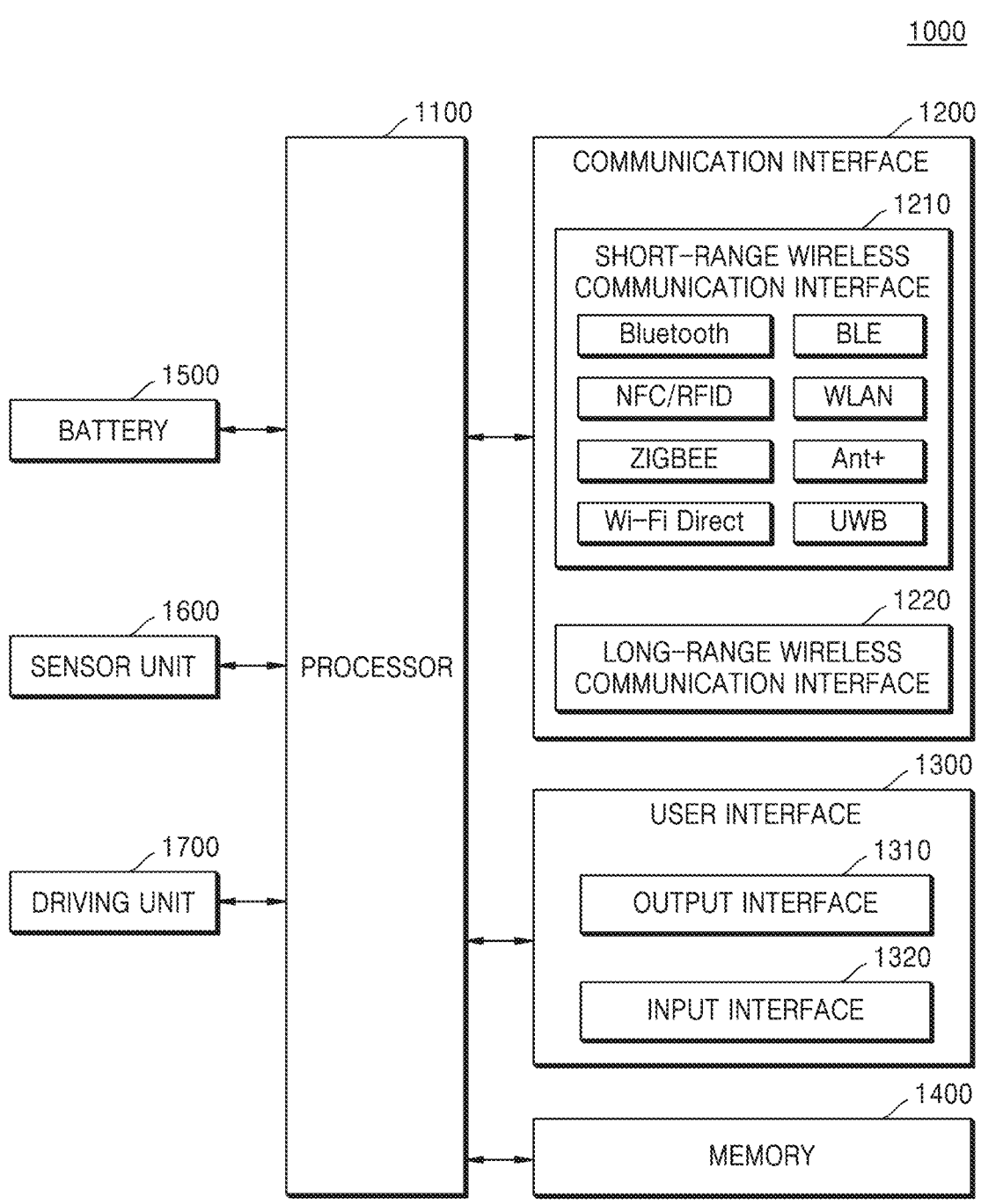
FIG. 15 is a block diagram of a mobile device according to an embodiment of the disclosure.

FIG. 15 is a block diagram of a mobile device 1000 according to an embodiment of the disclosure.

Referring to FIG. 15, the mobile device 1000 according to an embodiment of the disclosure may include a processor

1100, a communication interface 1200, a user interface 1300, a memory 1400, a battery 1500, a sensor unit 1600, and a driving unit 1700.

In an embodiment of the disclosure, the processor 1100 may include a plurality of processors, or may be a single processor. The processor 1100 may control the overall operation of the mobile device 1000. The processor 1100 may drive the driving unit 1700 to control the mobile device 1000 to move.

The processor 1100 according to an embodiment of the disclosure may include at least one of a central processing unit (CPU), a graphics processing unit (GPU), an accelerated processing unit (APU), a many-integrated core (MIC) processor, a digital signal processor (DSP), or a neural processing unit (NPU). The processor 1100 may be implemented in the form of an integrated system on a chip (SoC) including one or more electronic components. In a case in which the processor 1100 includes a plurality of processors, each processor may be implemented as separate hardware (H/W). The processor 1100 may be referred to as a microprocessor controller (MICOM), a microprocessor unit (MPU), or a microcontroller unit (MCU). The processor 1100 according to the disclosure may be implemented as a single-core processor or a multi-core processor.

The mobile device 1000 may include the communication interface 1200 for performing communication with an external device. For example, the mobile device 1000 may perform communication with the user terminal 20 and the wireless router 10 inside an in-home network, and/or an electronic device located in an insufficient wireless coverage area inside the home, through the communication interface 1200, and may establish wireless connection. In addition, in an embodiment of the disclosure, the mobile device 1000 may perform communication with an external server (not shown).

Here, the communication interface 1200 may communicate with the external server by using a first communication method (e.g., a LAN communication method), and communicate with the user terminal 20, the wireless router 10, and/or an electronic device located in an insufficient wireless coverage area inside the home, by using a second communication method (e.g., BLE or WFD connection).

The communication interface 1200 may include a short-range wireless communication interface 1210, a long-range wireless communication interface 1220, and the like. The short-range wireless communication interface 1210 may include, but is not limited to, a Bluetooth communication unit, a BLE communication unit, a near-field communication (NFC) unit, a wireless LAN (WLAN) (e.g., Wi-Fi) communication unit, a Zigbee communication unit, an IrDA communication unit, a UWB communication unit, an Ant+ communication unit, and the like. The BLE communication unit may enable communication through one-to-one BLE communication and/or one-to-many BLE mesh network wireless connection. The long-range wireless communication interface 1220 may be used by the mobile device 1000 to perform remote communication with an external server, or communication with the user terminal 20 when the user terminal 20 is outside the home. The long-range wireless communication interface 1220 may include the Internet, a computer network (e.g., a LAN or a wide area network (WAN)), and a mobile communication unit. The mobile communication unit may include, but is not limited to, a 3rd Generation (3G) module, a 4th Generation (4G) module, a 5th Generation (5G) module, a Long-Term Evolution (LTE) module, a narrowband IoT (NB-IoT) module, an LTE for Machines (LTE-M) module, and the like.

The communication interface 1200 may transmit data to the processor 1100 through, for example, a universal asynchronous receiver/transmitter (UART) protocol, which is asynchronous communication, but the communication method is not limited thereto.

The user interface 1300 of the mobile device 1000 may include an output interface 1310 and an input interface 1320. The input interface 1320 may serve as a unit through which a user may input a command into the mobile device 1000. The input interface 1320 may include, but is not limited to, a touch screen, a voice input unit, or a physical button. In a case in which the mobile device 1000 is a robot cleaner, the input interface 1320 may include a cleaning start operation button, a dust discharge button, a mode selection button, and the like. The output interface 1310 may include a display such as a light-emitting diode (LED), a liquid-crystal display (LCD), or a touch screen, or an audio output device, but is not limited thereto. In a case in which the mobile device 1000 is a robot cleaner, the serving robot 1000_2, or the cordless cleaner 1000_3, the output interface 1310 may display a state of charge of a battery, software update progress information, operation event information, overheating information of the mobile device 1000, and the like, but is not limited thereto.

The memory 1400 of the mobile device 1000 may store a program (e.g., one or more instructions) for the processor 1100 to control the overall operation of the mobile device 1000, and may store input/output data (e.g., home map information, position information of electronic devices that constitute an in-home network, and/or identification information of electronic devices that constitute an in-home network). For example, the memory 1400 of the mobile device 1000 may include, but is not limited to, software related to control of the mobile device 1000, information about whether wireless connection is available in an in-home network, in-home cleaning map information, home map information, error occurrence data (failure history data), types of operation events, battery charging-related information, and the like. The memory 1400 of the mobile device 1000 may store data received from an electronic device located in an insufficient wireless coverage area inside a home, after wirelessly connecting to the electronic device.

The memory 1400 may include at least one of a flash memory-type storage medium, a hard disk-type storage medium, a multimedia card micro-type storage medium, card-type memory (e.g., SD or XD memory), random-access memory (RAM), static RAM (SRAM), read-only memory (ROM), electrically erasable programmable ROM (EE-PROM), programmable ROM (PROM), magnetic memory, a magnetic disc, or an optical disc. Programs stored in the memory 1400 may be classified into a plurality of modules according to their functions.

The battery 1500 supplies power to mobile device 1000. The battery 1500 may be charged by a station (not shown) to which the mobile device 1000 is docked.

The sensor unit 1600 may be used to establish a movement path when the mobile device 1000 moves. In an embodiment of the disclosure, the sensor unit 1600 may be used to sense obstacles and the like on a movement path. According to an embodiment of the disclosure, the sensor unit 1600 may include an obstacle sensor, a bumper sensor, a fall prevention sensor, and the like, to be used when establishing a movement path when the mobile device 1000 moves.

The driving unit 1700 is a component that allows the mobile device 1000 to move in a space, and may include driving wheels. The driving wheel may be rotated by a driving motor included in the driving unit 1700.

The mobile device 1000 according to an embodiment of the disclosure is not limited to an automatic mobile cleaner such as a robot cleaner, and may also be a stick-type cordless cleaner. In a case in which the mobile device 1000 is a stick-type cordless cleaner, the sensor unit 1600 and the driving unit 1700 may be omitted.

All of the components illustrated in FIG. 15 are not essential components. The mobile device 1000 may be implemented by more or fewer components than those illustrated in FIG. 15.

Figure 16:
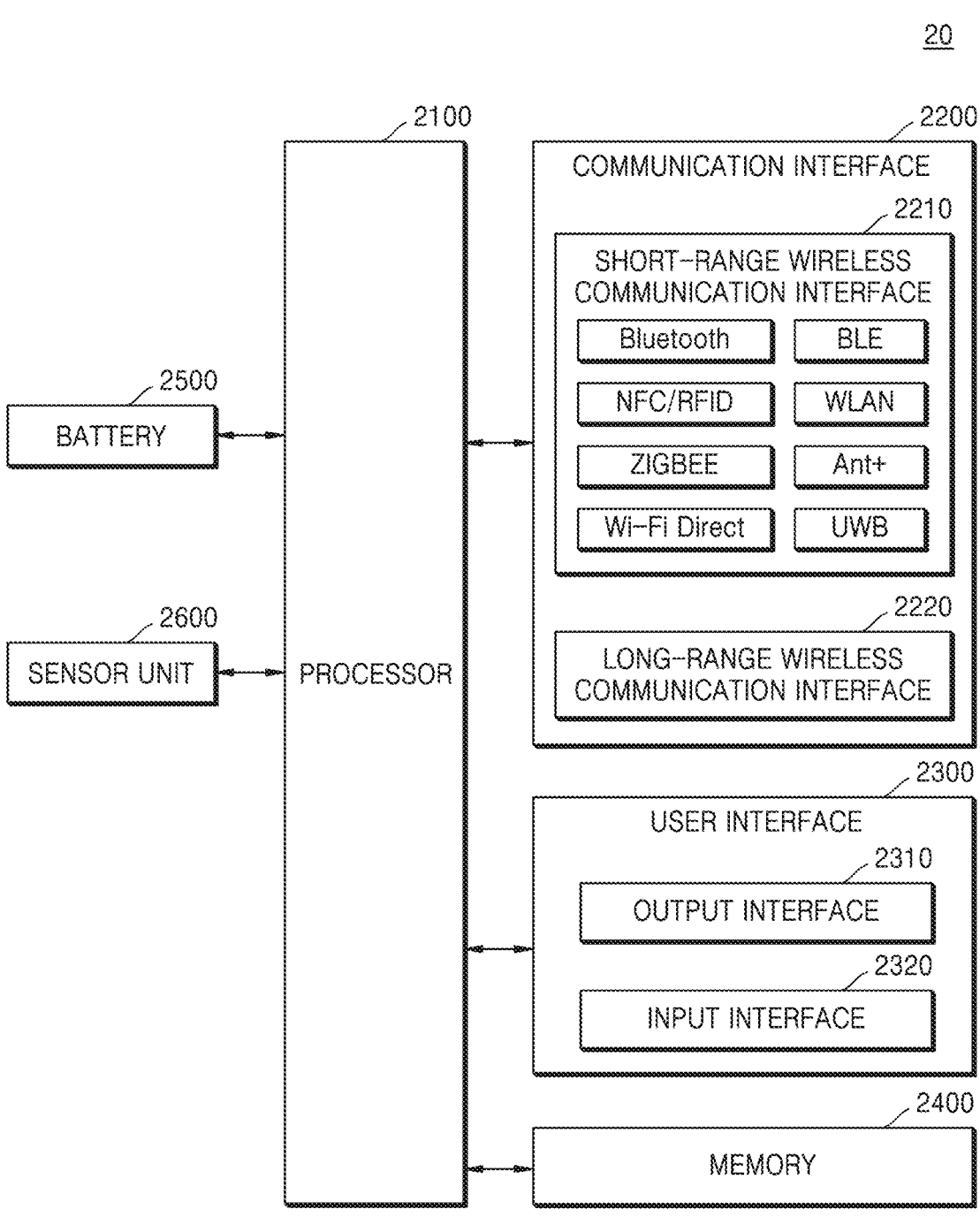
FIG. 16 is a block diagram of a user terminal according to an embodiment of the disclosure.

FIG. 16 is a block diagram of a user terminal according to an embodiment of the disclosure.

Referring to FIG. 16, the user terminal 20 according to an embodiment of the disclosure may include a processor 2100, a communication interface 2200, a user interface 2300, a memory 2400, a battery 2500, and a sensor unit 2600.

The processor 2100 may control the overall operation of the user terminal 20. In an embodiment of the disclosure, the processor 2100 may execute an application (e.g., an IoT control-related application or a communication-related application) that is executable on the user terminal 20. In addition, the processor 2100 may control the user terminal 20 to generate a movement command to instruct the mobile device 1000 to move, and transmit the movement command to the mobile device 1000 through the communication interface 2200.

The processor 2100 may include one processor or a plurality of processors. The processor 2100 according to the disclosure may include at least one of a CPU, a GPU, an APU, a MIC processor, a DSP, or an NPU. The processor 2100 may be implemented in the form of an integrated SoC including one or more electronic components. In a case in which the processor 2100 includes a plurality of processors, each processor may be implemented as separate hardware (H/W). The processor 2100 may be referred to as a MICOM, an MPU, or an MCU. The processor 2100 according to the disclosure may be implemented as a single-core processor or a multi-core processor.

The user terminal 20 may include the communication interface 2200 for performing communication with an external device. For example, the user terminal 20 may perform communication with the wireless router 10, the mobile device 1000, an external server (not shown), and/or other in-home network devices (not shown) through the communication interface 2200. Here, the communication interface 2200 may communicate with the external server by using a first communication method (e.g., a LAN communication method), and communicate with the mobile device 1000 by using a second communication method (e.g., a BLE connection communication method or a WFD communication method).

The communication interface 2200 may include a short-range wireless communication interface 2210, a long-range wireless communication interface 2220, and the like. The short-range wireless communication interface 2210 may include, but is not limited to, a Bluetooth communication unit, a BLE mesh network communication unit, an NFC unit, a WLAN (e.g., Wi-Fi) communication unit, a Zigbee communication unit, an IrDA communication unit, a WFD communication unit, a UWB communication unit, an Ant+ communication unit, and the like. The long-range wireless communication interface 2220 may be used by the user terminal 20 to remotely communicate with an external server, the wireless router 10, or the mobile device 1000. The long-range wireless communication interface 2220 may include the Internet, a computer network (e.g., a LAN or a WAN), and a mobile communication unit. The mobile communication unit may include, but is not limited to, a 3G module, a 4G module, a 5G module, an LTE module, an NB-IoT module, an LTE-M module, and the like.

The communication interface 2200 may transmit data to the processor 2100 through, for example, a UART protocol, which is asynchronous communication, but the communication method is not limited thereto.

The user interface 2300 of the user terminal 20 may include an output interface 2310 and an input interface 2320. The input interface 2320 may serve as a unit through which a user may input a command into the user terminal 20. The input interface 2320 may include, but is not limited to, a touch screen, a voice input unit, or a physical button. The input interface 2320 may include a touch screen, a physical button, a voice input unit, a fingerprint input unit, a face recognition input unit, and the like. The output interface 2310 may include a display such as an LED, an LCD, or a touch screen, or an audio output device, but is not limited thereto. The output interface 2310 may display home map information, information about electronic devices constituting an in-home network, information about whether connection with electronic devices constituting the in-home network is available, software update progress information, and the like, but is limited thereto.

The memory 2400 of the user terminal 20 may store a program (e.g., one or more instructions) for the processor 2100 to control the overall operation of the user terminal 20, and may store input/output data. For example, the memory 2400 of the user terminal 20 may store data received from an electronic device in an insufficient wireless coverage area inside a home. The memory 2400 may include information (e.g., identification information or position information) about electronic devices in the in-home network, map information about the electronic devices in the in-home network, version information of software installed on the user terminal 20, error occurrence data (e.g., a failure history data), and the like.

The memory 2400 may include at least one of a flash memory-type storage medium, a hard disk-type storage medium, a multimedia card micro-type storage medium, card-type memory (e.g., SD or XD memory), RAM, SRAM, ROM, EEPROM, PROM, magnetic memory, a magnetic disc, or an optical disc. Programs stored in the memory 2400 may be classified into a plurality of modules according to their functions.

The battery 2500 supplies power to the user terminal 20.

In an embodiment of the disclosure, the sensor unit 2600 may include a camera sensor through which the user terminal 20 captures an image.

All of the components illustrated in FIG. 16 are not essential components. The user terminal 20 may be implemented by more or fewer components than those illustrated in FIG. 16.

A robot cleaner capable of moving for cleaning and having an in-home wireless connection function according to an embodiment of the disclosure may include a battery to supply power to the robot cleaner. According to an embodiment of the disclosure, the robot cleaner may include a suction motor configured to suck in dust. According to an embodiment of the disclosure, the robot cleaner may include a sensor unit configured to establish a movement path while moving. According to an embodiment of the disclosure, the robot cleaner may include a brush to perform cleaning for sucking in dust while the robot cleaner is moving. According to an embodiment of the disclosure, the robot cleaner may include a driving unit driven by the battery and including driving wheels for moving along the movement path established by the sensor unit to perform cleaning through the brush and the suction motor. According to an embodiment of the disclosure, the robot cleaner may include a processor configured to, based on determining, based on a strength of a wireless connection signal between a first home appliance and a wireless router inside a home, that a wireless connection between the first home appliance and the wireless router is unavailable, drive and control the driving unit to move within a predetermined distance from the first home appliance, for establishing the wireless connection with the first home appliance. According to an embodiment of the disclosure, the robot cleaner may include a communication interface configured to, based on the first home appliance being located within a predetermined distance, receive a connection request signal from the first home appliance, and upon receiving the connection request signal, establish the wireless connection with the first home appliance based on the received connection request signal. In the robot cleaner according to an embodiment of the disclosure, the communication interface may include at least one of a BLE communication unit or a Wi-Fi communication unit.

In the robot cleaner having an in-home wireless connection function according to an embodiment of the disclosure, the wireless connection is a BLE connection through the BLE communication unit, or a Wi-Fi direct connection through the Wi-Fi communication unit.

In the robot cleaner with an in-home wireless connection function according to an embodiment of the disclosure, the processor is further configured to, based on determining that the wireless connection through the BLE connection is unavailable, establish the wireless connection through the Wi-Fi direct connection.

In the robot cleaner having an in-home wireless connection function according to an embodiment of the disclosure, the processor is further configured to determine, based on the connection request signal, whether the BLE connection with the first home appliance is available, or whether the Wi-Fi direct connection with the first home appliance is available.

In the robot cleaner having an in-home wireless connection function according to an embodiment of the disclosure, the BLE connection is a BLE mesh network wireless connection.

In the robot cleaner having an in-home wireless connection function according to an embodiment of the disclosure, the processor is further configured to, based on the robot cleaner moving within the predetermined distance from the first home appliance, control the robot cleaner to transmit a wake-up signal to the first home appliance through the communication interface. In the robot cleaner having an in-home wireless connection function according to an embodiment of the disclosure, receiving, by the communication interface, the connection request signal from the first home appliance includes receiving, by the communication interface, the connection request signal transmitted by the first home appliance in response to the wake-up signal.

In the robot cleaner having an in-home wireless connection function according to an embodiment of the disclosure, the processor is further configured to, based on receiving a signal indicating that the wireless connection with the first home appliance is unavailable, determine that the wireless connection with the first home appliance is unavailable.

In the robot cleaner having an in-home wireless connection function according to an embodiment of the disclosure, the communication interface is further configured to receive, from a user terminal or a server, the signal indicating that the wireless connection is unavailable. In the robot cleaner having an in-home wireless connection function according to an embodiment of the disclosure, the signal indicating that the wireless connection is unavailable may include a movement command to move within the predetermined distance from the first home appliance.

In the robot cleaner having an in-home wireless connection function according to an embodiment of the disclosure, the communication interface is further configured to receive data related to the first home appliance, from the first home appliance based on the established wireless connection.

In the robot cleaner having an in-home wireless connection function according to an embodiment of the disclosure, the processor is further configured to transmit the received data related to the first home appliance to the user terminal or the server through the communication interface.

In the robot cleaner having an in-home wireless connection function according to an embodiment of the disclosure, the robot cleaner may further include a memory storing information about whether one or more wireless connections with a plurality of devices inside the home are available.

In the robot cleaner having an in-home wireless connection function according to an embodiment of the disclosure, the information about whether the one or more wireless connections with the plurality of devices inside the home are available may include a wireless connection signal strength for each of the plurality of devices.

In the robot cleaner having an in-home wireless connection function according to an embodiment of the disclosure, the information about whether wireless connection with the plurality of devices inside the home is available may further include map information including positions of the plurality of devices inside the home and the wireless connection signal strength for each of the plurality of devices.

In the robot cleaner having an in-home wireless connection function according to an embodiment of the disclosure, the map information including the wireless connection signal strength for each of the plurality of devices may be updated based on a predetermined time interval or event.

In the robot cleaner having an in-home wireless connection function according to an embodiment of the disclosure, the processor is further configured to establish the wireless connection with the first home appliance, for wireless connection with the first home appliance and a second home appliance for which wireless connection establishment has been requested, among the plurality of devices, and then drive and control the driving unit to move within a predetermined distance from the second home appliance.

In the robot cleaner having an in-home wireless connection function according to an embodiment of the disclosure, the first home appliance is a device that has established the wireless connection with the robot cleaner at least once and then has been registered in at least one of the robot cleaner, a user terminal, or a server, before determining that the wireless connection with the first home appliance inside the home is unavailable.

A cordless cleaner device having an in-home wireless connection function according to an embodiment of the disclosure may include a battery to supply power to the cordless cleaner device. According to an embodiment of the disclosure, the cordless cleaner device may include a suction motor configured to suck in dust. According to an embodiment of the disclosure, the cordless cleaner device may include a processor configured to determine, based on the strength of a wireless connection signal between a first home appliance and a wireless router inside a home, that the wireless connection between the first home appliance and the wireless router is unavailable. According to an embodiment of the disclosure, the cordless cleaner device may include a user interface configured to, based on determining that the wireless connection between the first home appliance and the wireless router is unavailable, output guide information for wireless connection with the first home appliance. According to an embodiment of the disclosure, the cordless cleaner device may include a communication interface configured to, based on the cordless cleaner device moving within a predetermined distance from the first home appliance based on the guide information, receive a connection request signal from the first home appliance, and upon receiving the connection request signal, establish the wireless connection based on the received connection request signal. In the cordless cleaner device according to an embodiment of the disclosure, the communication interface may include at least one of a BLE communication unit or a Wi-Fi communication unit.

In the cordless cleaner device having an in-home wireless connection function according to an embodiment of the disclosure, the guide information may include at least one of identification information of the first home appliance for which the wireless connection is determined to be unavailable, or position information of the first home appliance.

In the cordless cleaner device having an in-home wireless connection function according to an embodiment of the disclosure, the wireless connection may be a BLE connection through the BLE communication unit, or a Wi-Fi direct connection through the Wi-Fi communication unit. In the cordless cleaner device having an in-home wireless connection function according to an embodiment of the disclosure, the processor is further configured to, based on determining that the BLE connection is unavailable, establish the wireless connection through the Wi-Fi direct connection.

A method of performing in-home wireless connection according to an embodiment of the disclosure may include determining, based on a wireless connection signal strength, that a wireless connection with a first home appliance inside a home is unavailable. The method of performing in-home wireless connection according to an embodiment of the disclosure may include, based on determining that wireless connection with the first home appliance is unavailable, driving and controlling a driving unit of the robot cleaner to move within a predetermined distance from the first home appliance to establish wireless connection with the first home appliance. The method of performing in-home wireless connection according to an embodiment of the disclosure may include, based on the robot cleaner being located within the predetermined distance from the first home appliance, receiving a connection request signal from the first home appliance. The method of performing in-home wireless connection according to an embodiment of the disclosure may include establishing the wireless connection based on the received connection request signal.

A computer-readable medium according to an embodiment of the disclosure may include program commands for performing a method of performing in-home wireless connection, and the program commands may include determining, based on a wireless connection signal strength, that a wireless connection with a first home appliance inside a home is unavailable. The program commands according to an embodiment of the disclosure may include, based on determining that the wireless connection with the first home appliance is unavailable, driving and controlling a driving unit to move within a predetermined distance from the first home appliance to establish wireless connection with the first home appliance. The program commands according to an embodiment of the disclosure may include, based on the robot cleaner being located within the predetermined distance from the first home appliance, receiving a connection request signal from the first home appliance. The program commands according to an embodiment of the disclosure may include establishing the wireless connection based on the received connection request signal.

The method according to an embodiment of the disclosure may be embodied as program commands executable by various computer devices, and recorded on a computer-readable medium. The computer-readable medium may include program commands, data files, data structures, or the like separately or in combinations. The program commands to be recorded on the medium may be specially designed and configured for the disclosure or may be well-known to and be usable by those skill in the art of computer software. Examples of the computer-readable recording medium include magnetic media such as hard disks, floppy disks, or magnetic tapes, optical media such as a compact disc ROM (CD-ROM) or a digital video disc (DVD), magneto-optical media such as a floptical disk, and hardware devices such as ROM, RAM, or flash memory, which are specially configured to store and execute program commands. Examples of the program commands include not only machine code, such as code made by a compiler, but also high-level language code that is executable by a computer by using an interpreter or the like.

In an embodiment of the disclosure may be implemented as a recording medium including computer-readable instructions such as a computer-executable program module. The computer-readable medium may be any available medium which is accessible by a computer, and may include a volatile or non-volatile medium and a removable or non-removable medium. Also, the computer-readable medium may include a computer storage medium and a communication medium. The computer storage media include both volatile and non-volatile, removable and non-removable media implemented in any method or technique for storing information such as computer readable instructions, data structures, program modules or other data. The communication media typically include computer-readable instructions, data structures, program modules, other data of a modulated data signal, or other transmission mechanisms, and examples thereof include an arbitrary information transmission medium. Also, in an embodiment of the disclosure may be implemented as a computer program or a computer program product including computer-executable instructions such as a computer program executed by a computer.

A machine-readable storage medium may be provided in the form of a non-transitory storage medium. Here, the term 'non-transitory storage medium' refers to a tangible device and does not include a signal (e.g., an electromagnetic wave), and the term 'non-transitory storage medium' does not distinguish between a case where data is stored in a storage medium semi-permanently and a case where data is stored temporarily. For example, the 'non-transitory storage medium' may include a buffer in which data is temporarily stored.

According to an embodiment of the disclosure, methods according to an embodiment disclosed herein may be included in a computer program product and then provided. The computer program product may be traded as commodities between sellers and buyers. The computer program product may be distributed in the form of a machine-readable storage medium (e.g., a CD-ROM), or may be distributed online (e.g., downloaded or uploaded) through an application store or directly between two user devices (e.g., smart phones). In a case of online distribution, at least a portion of the computer program product (e.g., a downloadable app) may be temporarily stored in a machine-readable storage medium such as a manufacturer's server, an application store's server, or a memory of a relay server.

What is claimed is:

1. A robot cleaner capable of moving for cleaning and having an in-home wireless connection function, the robot cleaner comprising:
   a battery to supply power to the robot cleaner;
   a suction motor configured to suck in dust;
   a sensor unit configured to establish a movement path during movement of the robot cleaner;
   a brush to perform cleaning for sucking in dust while the robot cleaner is moving;
   a driving unit driven by the battery and comprising driving wheels for moving along the movement path established by the sensor unit to perform cleaning through the brush and the suction motor;
   a processor configured to, based on determining, based on a strength of a wireless connection signal between a first home appliance and a wireless router inside a home, that a wireless connection between the first home appliance and the wireless router is unavailable, drive and control the driving unit to move within a predetermined distance from the first home appliance for establishing the wireless connection with the first home appliance; and
   a communication interface configured to, based on the first home appliance being located within a predetermined distance from the robot cleaner, receive a connection request signal from the first home appliance, and upon receiving the connection request signal, establish the wireless connection with the first home appliance based on the received connection request signal,
   wherein the communication interface comprises at least one of a Bluetooth Low Energy (BLE) communication unit or a Wi-Fi communication unit.

2. The robot cleaner of claim 1, wherein the wireless connection is a BLE connection through the BLE communication unit, or a Wi-Fi direct (WFD) connection through the Wi-Fi communication unit.

3. The robot cleaner of claim 2, wherein the processor is further configured to, based on determining that the wireless connection through the BLE connection is unavailable, establish the wireless connection through the WFD connection.

4. The robot cleaner of claim 3, wherein the processor is further configured to determine, based on the connection request signal, whether the BLE connection with the first home appliance is available, or whether the WFD connection with the first home appliance is available.

5. The robot cleaner of claim 2, wherein the BLE connection is a BLE mesh network wireless connection.

6. The robot cleaner of claim 1, wherein the processor is further configured to, based on the robot cleaner moving within the predetermined distance from the first home appliance, control the robot cleaner to transmit a wake-up signal to the first home appliance through the communication interface, and receive, by the communication interface, the connection request signal from the first home appliance comprising receiving, by the communication interface, the connection request signal transmitted by the first home appliance in response to the wake-up signal.

7. The robot cleaner of claim 1, wherein the processor is further configured to, based on receiving a signal indicating that the wireless connection with the first home appliance is unavailable, determine that the wireless connection with the first home appliance is unavailable.

8. The robot cleaner of claim 7, wherein the communication interface is further configured to receive, from a user terminal or a server, the signal indicating that the wireless connection is unavailable, and
   the signal indicating that the wireless connection is unavailable comprises a movement command to move within the predetermined distance from the first home appliance.

9. The robot cleaner of claim 1, wherein the communication interface is further configured to receive data related to the first home appliance, from the first home appliance based on the established wireless connection.

10. The robot cleaner of claim 9, wherein the processor is further configured to transmit the received data related to the first home appliance to a user terminal or a server through the communication interface.

11. The robot cleaner of claim 1, further comprising a memory storing information about whether one or more wireless connections with a plurality of devices inside the home are available.

12. The robot cleaner of claim 11, wherein the information about whether the one or more wireless connections with the plurality of devices inside the home are available comprises a wireless connection signal strength for each of the plurality of devices.

13. The robot cleaner of claim 12, wherein the information about whether the one or more wireless connections with the plurality of devices inside the home are available further comprises map information comprising positions of the plurality of devices inside the home and the wireless connection signal strength for each of the plurality of devices.

14. The robot cleaner of claim 13, wherein the map information comprising the wireless connection signal strength for each of the plurality of devices is updated based on a predetermined time interval or event.

15. The robot cleaner of claim 11, wherein the processor is further configured to establish the wireless connection with the first home appliance, for wireless connection with the first home appliance and a second home appliance for which wireless connection establishment has been requested, among the plurality of devices, and then drive and control the driving unit to move within a predetermined distance from the second home appliance.

16. The robot cleaner of claim 1, wherein the first home appliance is a device that has established the wireless connection with the robot cleaner at least once and then has been registered in at least one of the robot cleaner, a user terminal, or a server, before determining that the wireless connection with the first home appliance inside the home is unavailable.

17. A cordless cleaner device having an in-home wireless connection function, the cordless cleaner device comprising:
   a battery to supply power to the cordless cleaner device;
   a suction motor configured to suck in dust;
   a processor configured to determine, based on a strength of a wireless connection signal between a first home appliance and a wireless router inside a home, that a wireless connection between the first home appliance and the wireless router is unavailable;
   a user interface configured to, based on determining that the wireless connection between the first home appliance and the wireless router is unavailable, output guide information for the wireless connection with the first home appliance; and a communication interface configured to, based on the cordless cleaner device moving within a predetermined distance from the first home appliance based on the guide information, receive a connection request signal from the first home appliance, and upon receiving the connection request signal, establish the wireless connection based on the received connection request signal, wherein the communication interface comprises at least one of a Bluetooth Low Energy (BLE) communication unit or a Wi-Fi communication unit.

18. The cordless cleaner device of claim 17, wherein the guide information comprises at least one of identification information of the first home appliance for which the wireless connection is determined to be unavailable, or position information of the first home appliance.

19. The cordless cleaner device of claim 17, wherein the wireless connection is a BLE connection through the BLE communication unit, or a Wi-Fi direct connection through the Wi-Fi communication unit, and the processor is further configured to, based on determining that the BLE connection is unavailable, establish the wireless connection through the Wi-Fi direct connection.

20. A method, performed by a robot cleaner, of performing in-home wireless connection, the method comprising:

determining, based on a wireless connection signal strength, that a wireless connection with a first home appliance inside a home is unavailable;

based on determining that a wireless connection with the first home appliance is unavailable, driving and controlling a driving unit of the robot cleaner to move within a predetermined distance from the first home appliance to establish the wireless connection with the first home appliance;

based on the robot cleaner being located within the predetermined distance from the first home appliance, receiving a connection request signal from the first home appliance; and establishing the wireless connection based on the received connection request signal.

* * * * *